(12) United States Patent
Dhumal

(10) Patent No.: US 11,980,166 B2
(45) Date of Patent: May 14, 2024

(54) POULTRY FEEDER INCLUDING PAN MEANS AND REMOVABLY ATTACHED DROP TUBE

(71) Applicant: Anil Somnath Dhumal, Maharashtra (IN)

(72) Inventor: Anil Somnath Dhumal, Maharashtra (IN)

( * ) Notice: Subject to any disclaimer, the term of this patent is extended or adjusted under 35 U.S.C. 154(b) by 350 days.

(21) Appl. No.: 15/523,346

(22) PCT Filed: Oct. 28, 2015

(86) PCT No.: PCT/IN2015/000401
§ 371 (c)(1),
(2) Date: Apr. 28, 2017

(87) PCT Pub. No.: WO2016/067305
PCT Pub. Date: May 6, 2016

(65) Prior Publication Data
US 2017/0245475 A1  Aug. 31, 2017

(30) Foreign Application Priority Data
Oct. 31, 2014  (IN) .......................... 3461/MUM/2014

(51) Int. Cl.
*A01K 39/012* (2006.01)
*A01K 39/01* (2006.01)

(52) U.S. Cl.
CPC ...... *A01K 39/0125* (2013.01); *A01K 39/0113* (2013.01)

(58) Field of Classification Search
CPC ...... A01K 39/00; A01K 39/01; A01K 39/012; A01K 39/0125; A01K 39/0113
(Continued)

(56) References Cited

U.S. PATENT DOCUMENTS

| 4,476,811 A | 10/1984 | Swartzendruber |
| 4,995,343 A | 2/1991 | Cole et al. |

(Continued)

FOREIGN PATENT DOCUMENTS

| BR | 112017009008 A2 | 10/2015 |
| CN | 202374862 U | 8/2012 |

(Continued)

OTHER PUBLICATIONS

International Search Report, mailing date Apr. 28, 2016 for corresponding International Application No. PCT/IN2015/000401.
(Continued)

*Primary Examiner* — Brady W Frazier
(74) *Attorney, Agent, or Firm* — MASCHOFF BRENNAN

(57) ABSTRACT

This invention comprises a poultry feeder assembly (3) for providing access to feed to chicks of small breeds as well as growing and fully grown up birds from the same poultry feeder assembly, provided with a barrier to minimize entry of the chicks inside a feed containing pan (25) of the poultry feeder assembly. The poultry feeder assembly being attachable to a feeder pipe (4) that has spiral auger for automatic conveying of feed from a small hopper (2) to the poultry feeder assembly attached to the pipe, and the pipe is provided with a system for level adjustment or height adjustment from ground or floor of a poultry house; wherein, the pan for holding the feed is separable for cleaning purposes from the tube that conveys feed received from a feeding pipe to the pan.

10 Claims, 19 Drawing Sheets

Figure 18:
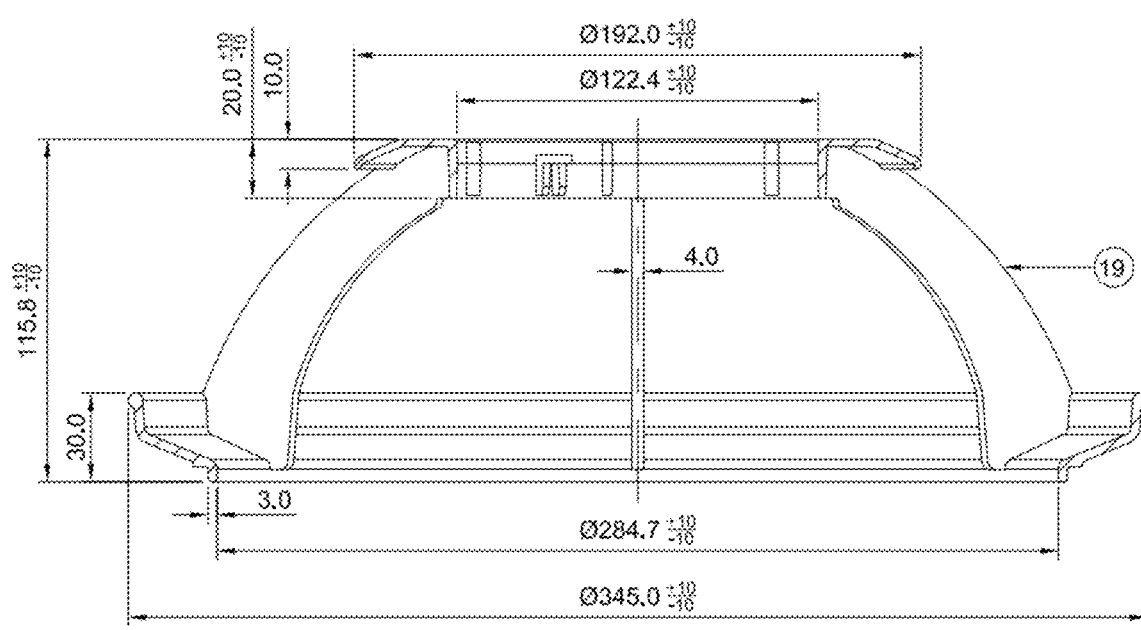

(58) Field of Classification Search
USPC .................................. 119/51.01, 52.1, 52.4
See application file for complete search history.

(56) References Cited

U.S. PATENT DOCUMENTS

| | | | |
|---|---|---|---|
| 5,311,839 | A | 5/1994 | Pollock et al. |
| 5,462,017 | A | 10/1995 | Pollock et al. |
| 5,718,187 | A | 2/1998 | Pollock et al. |
| 5,762,021 | A * | 6/1998 | Horwood .......... A01K 39/0125 119/52.1 |
| 5,765,503 | A * | 6/1998 | van Daele .......... A01K 39/0125 119/52.4 |
| 5,778,821 | A | 7/1998 | Horwood et al. |
| 5,794,562 | A * | 8/1998 | Hart .................. A01K 39/0125 119/52.4 |
| 5,957,083 | A | 9/1999 | Cheng |
| 6,050,220 | A | 4/2000 | Kimmel et al. |
| 6,349,672 | B1 * | 2/2002 | Daffi .................. A01K 39/0125 119/52.1 |
| 6,470,826 | B2 | 10/2002 | Thuline |
| 6,655,317 | B1 * | 12/2003 | Steudler, Jr. ....... A01K 39/0125 119/53 |
| 7,107,932 | B2 * | 9/2006 | Cole .................. A01K 39/0125 119/51.01 |
| 7,647,888 | B2 | 1/2010 | Slankard et al. |
| 2012/0199077 | A1 * | 8/2012 | Cottam ............. A01K 39/0125 119/52.1 |
| 2017/0258053 | A1 * | 9/2017 | Teh .................... H04B 7/18589 |

FOREIGN PATENT DOCUMENTS

| | | |
|---|---|---|
| EA | 037082 B1 | 2/2021 |
| KR | 101171242 B1 | 8/2012 |

OTHER PUBLICATIONS

Written Opinion of ISA, mailing date Apr. 28, 2016 for corresponding International Application No. PCT/IN2015/000401.
Examination Report, dated Feb. 15, 2019 for the corresponding India Patent Application No. 3461/MUM/2014, pp. 1-5.
Notice of Office Action, dated Aug. 22, 2019 with English translation for corresponding Eurasian Application No. 201790964 / 31, pp. 1-2.
Notice of Office Action, dated May 22, 2020 with English translation for corresponding Eurasian Application No. 201790964, pp. 1-4.
Notice of Office Action, dated Nov. 3, 2020 with English translation for corresponding Eurasian Application No. 201790964, pp. 1-9.
Technical Examination Report, BPTO, dated May 22, 2021 for corresponding Brazil Application No. BR112017009008-2, with English translation (total 13 pages).
Publication Notice of Allowance in Official Gazette No. 2630 of BPTO with Allowed Claims, dated Jun. 1, 2021 for corresponding Brazil Application No. BR112017009008-2 (total 14 pages).
The Eurasian Patent Organization, The Eurasian Patent Office; Decision to Grant dated Dec. 18, 2020 on EA Application No. 201790964; English translation; 2 pages.
Brazilian Patent and Trademark Office; Technical Examination Report dated May 21, 2021 issued in Application No. BR112017009008-2; English translation; 13 pages.

* cited by examiner

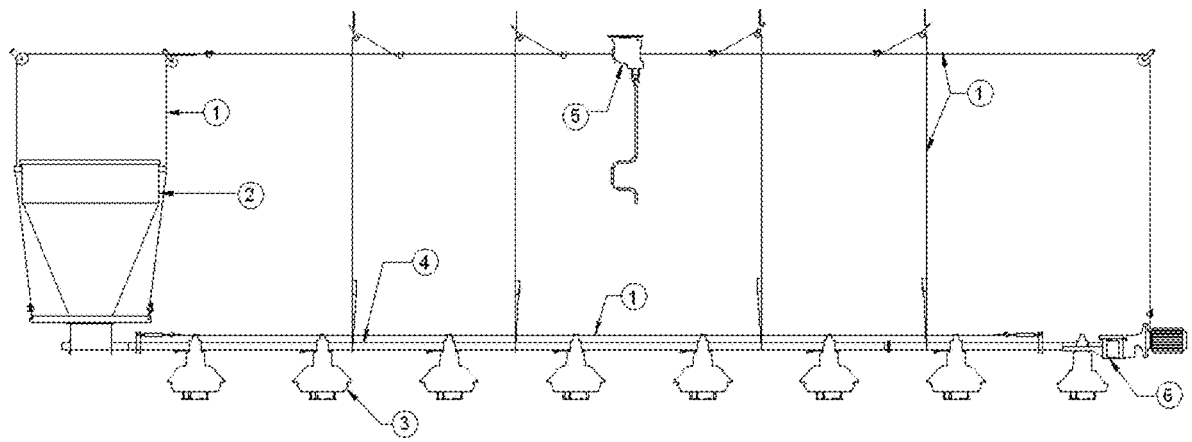
Figure 1 – Prior art
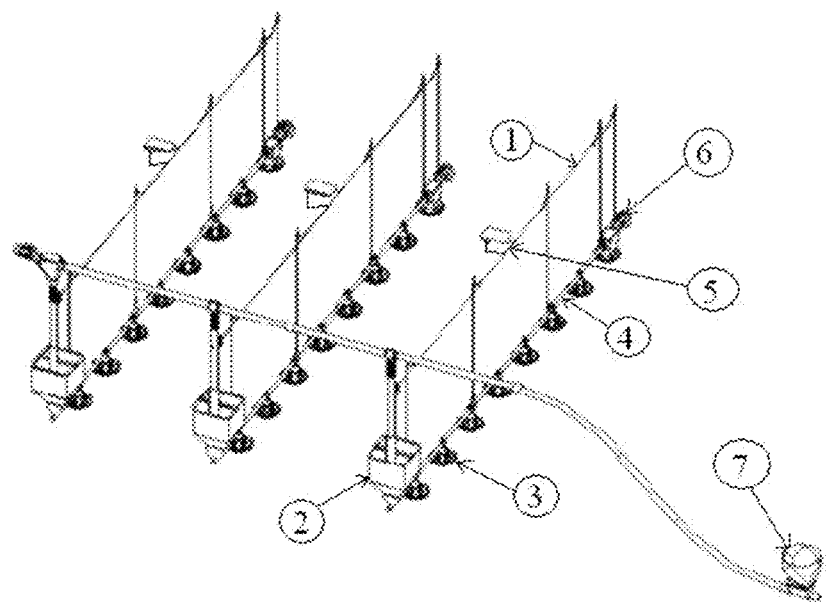
Figure 2 – Prior art

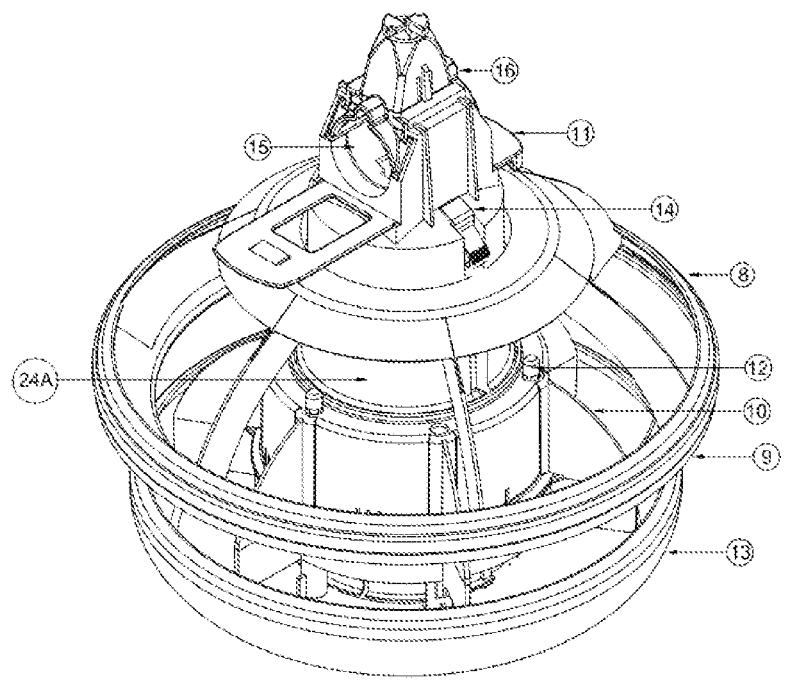
Figure 3 – (Prior Art)
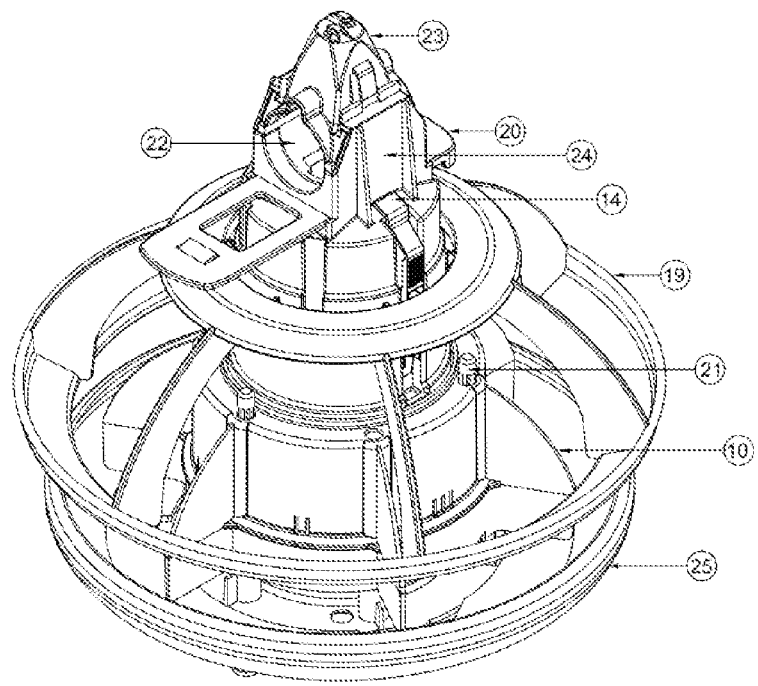
Figure 4

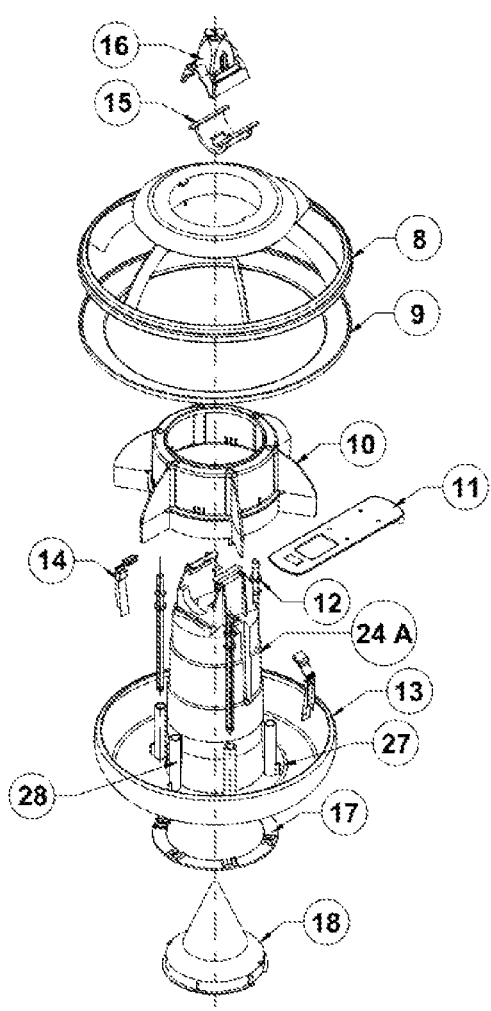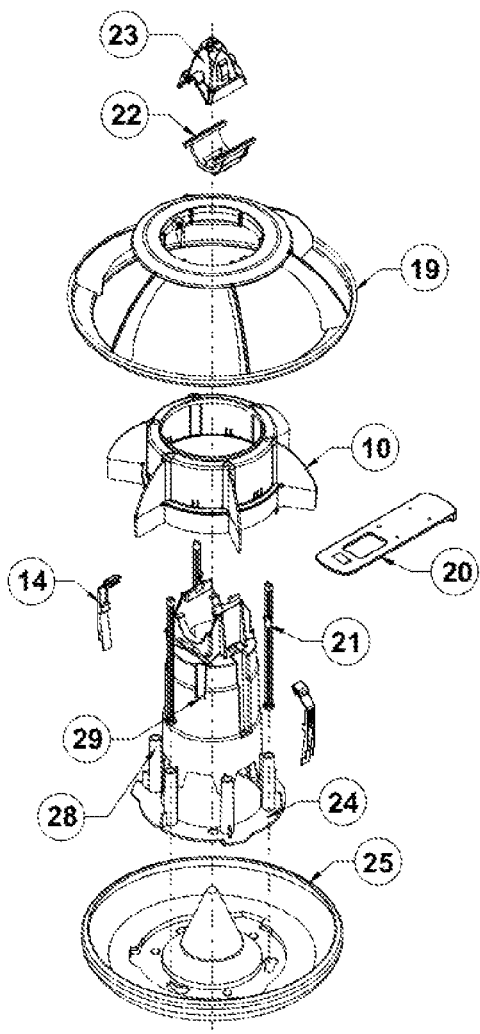
Figure 5 – (Prior Art)　　　　　　　Figure 6

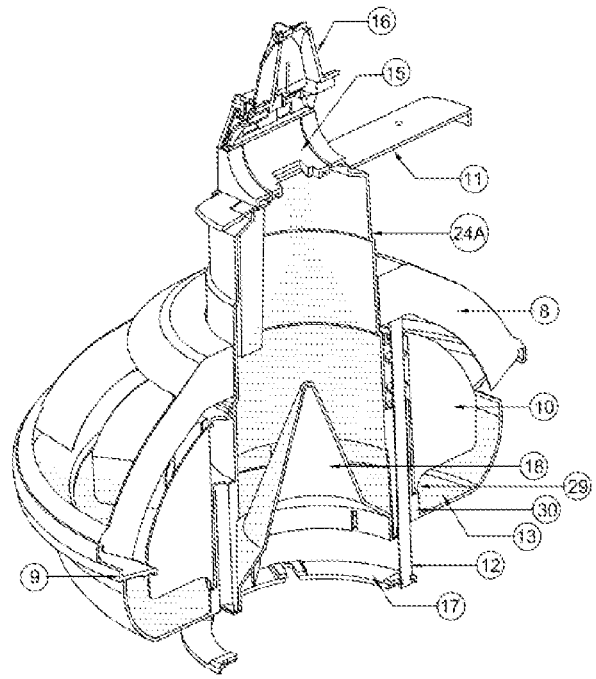
Figure 7 – (Prior Art)
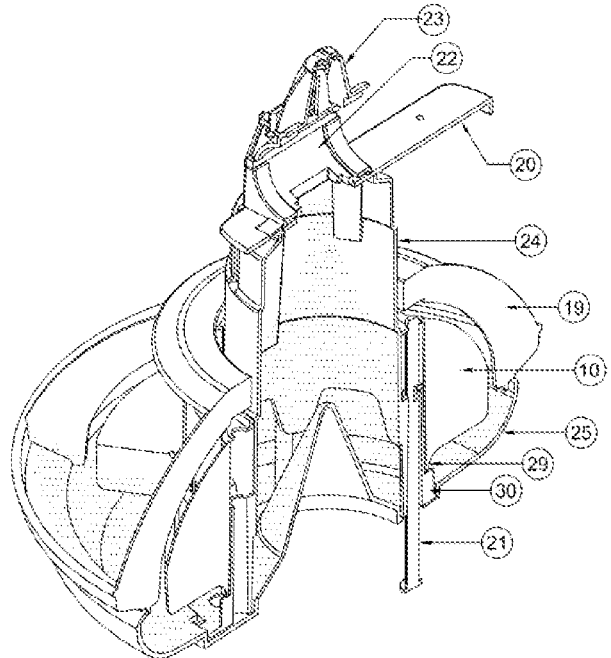
Figure 8

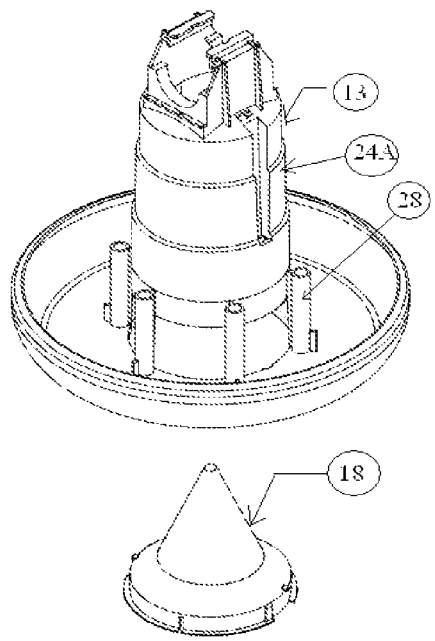
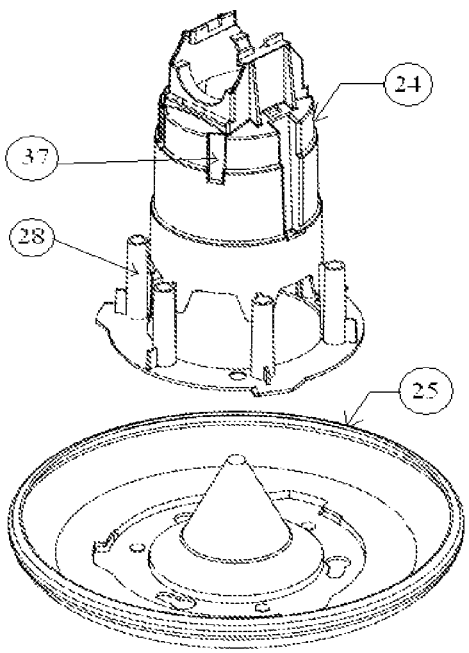
Figure 9 A – (Prior Art)  Figure 9 B
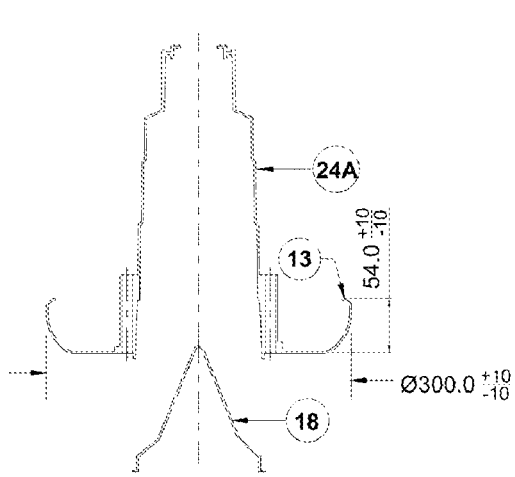
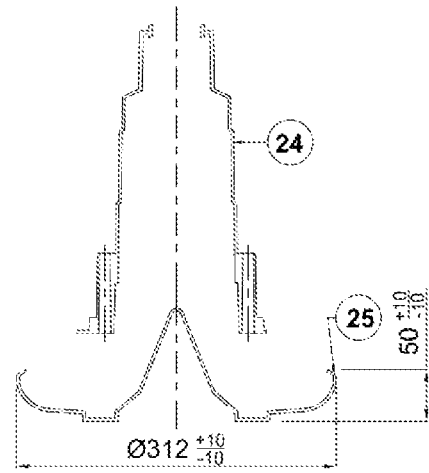
Figure 10 A – (Prior Art)  Figure 10 B

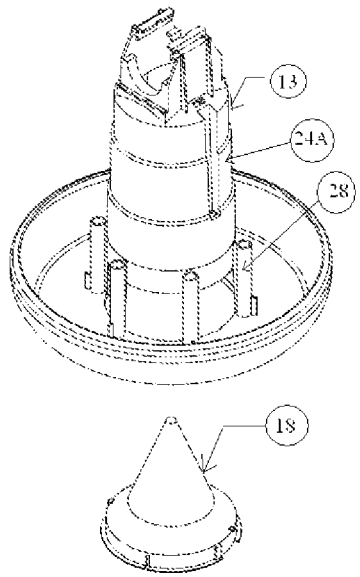
Figure 11 A – (Prior Art)
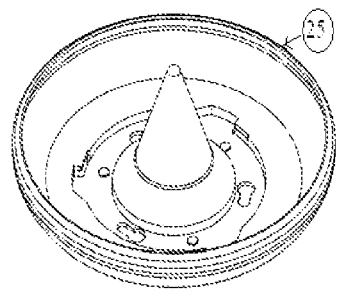
Figure 11 B
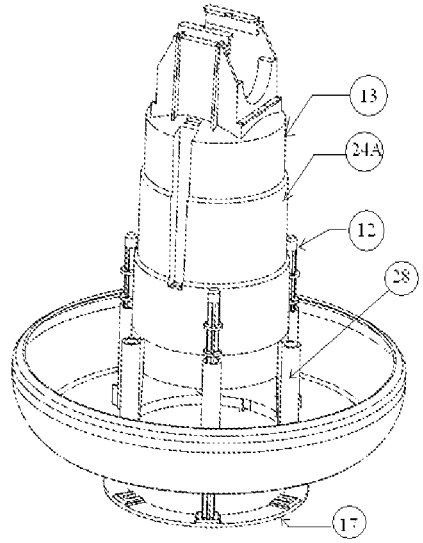
Figure 12 A – (Prior Art)
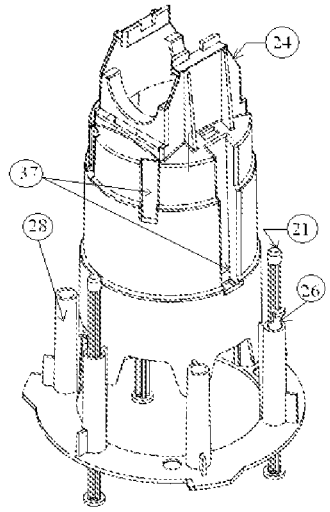
Figure 12 B

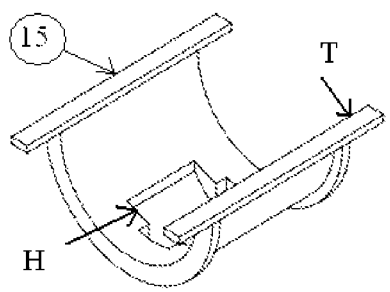
Figure 13 A – (Prior Art)
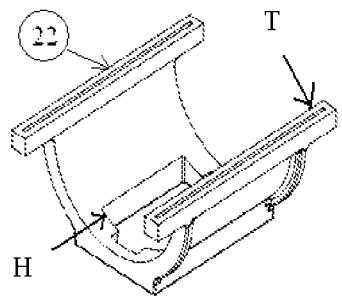
Figure 13 B
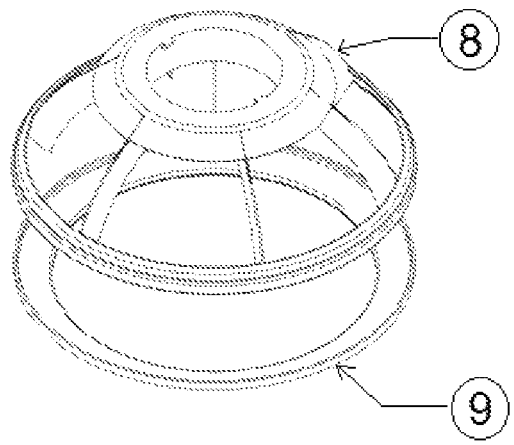
Figure 14 A – (Prior Art)
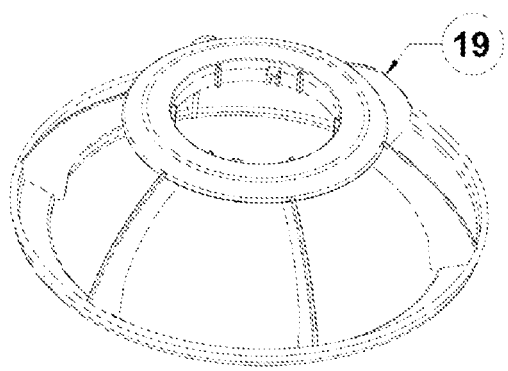
Figure 14 B
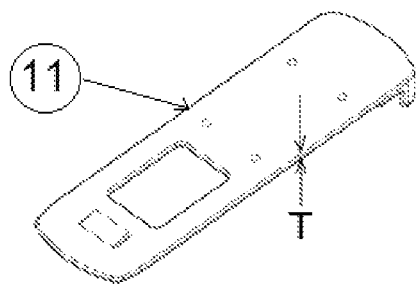
Figure 15 A – (Prior Art)
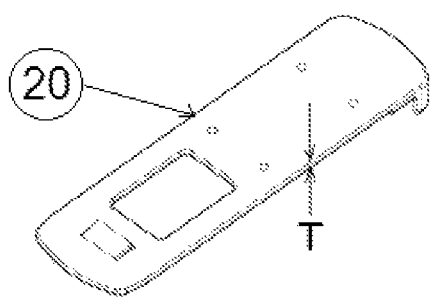
Figure 15 B

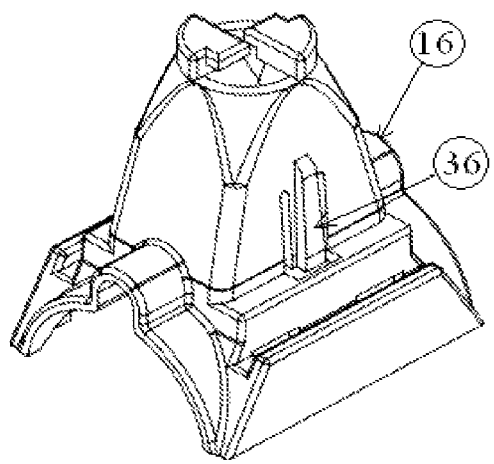
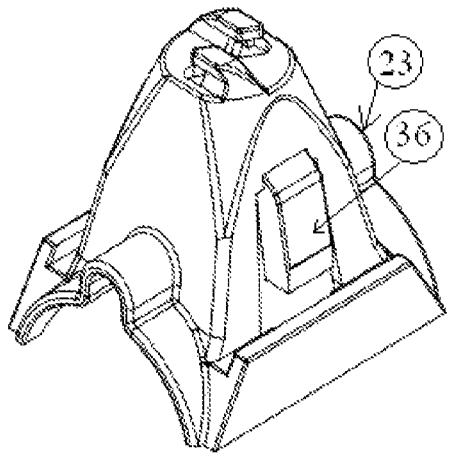
Figure 16 A – (Prior Art)     Figure 16 B
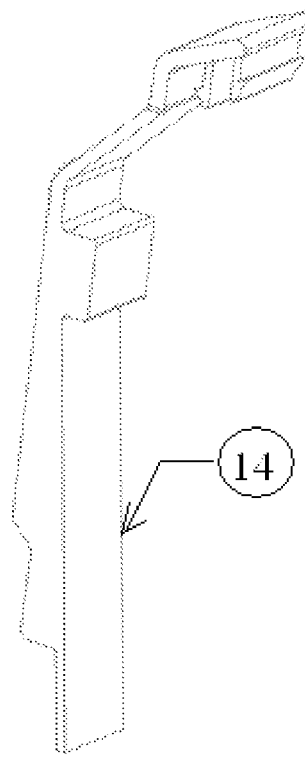
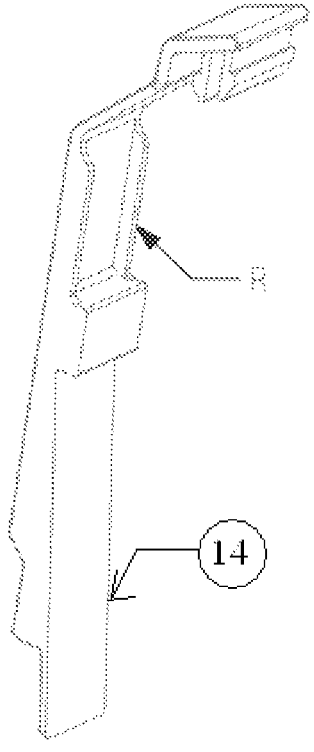
Figure 17 – (Prior Art)     Figure 17 B

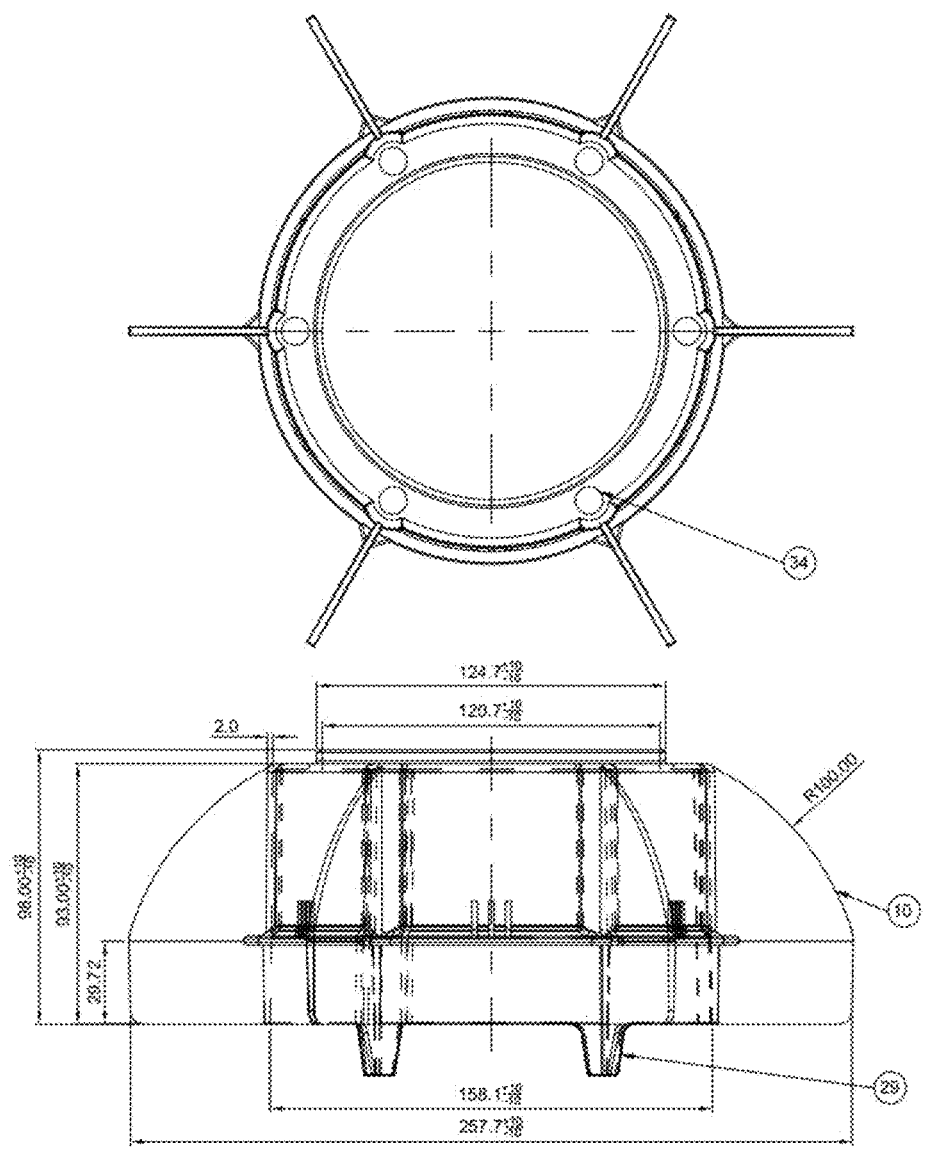
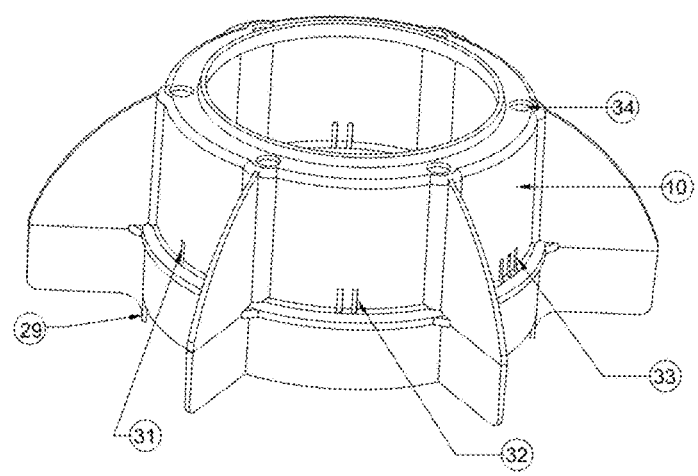
Figure 19

POULTRY FEEDER INCLUDING PAN MEANS AND REMOVABLY ATTACHED DROP TUBE

FIELD OF THE INVENTION

The invention pertains to the field of poultry equipment. Particularly, it pertains to improvement in poultry feeder.

BACKGROUND OF THE INVENTION

Poultry farming comprises raising of domesticated birds (chickens) for the purpose of meat or eggs for food. A poultry feeder is used for such poultry farming to feed the birds. For the purpose of this specification, the term "Poultry" is restricted to *Gallus gallus domesticus*, the young ones of which are called here as chicks and the adult ones who have reached fully grown size, interchangeably, as "chicken" or "birds".

Economics of a Poultry Farming is based, amongst several factors, on designing poultry equipment that achieves labour saving, avoidance of spillage and avoiding soiling of precious feed, achieving control on feeding to allow optimum feeding and avoiding excessive or underfeeding.

Normally, due to different sizes and different feeding requirements of different sets of feeders are used for the chicks and grown up birds. Prior art practice includes spreading the feed on paper or cardboard on the floor of the poultry house when chicks are day-old and little older. This is followed, which chicks get older by keeping the feed in shallow pans on the floor, and later gradually introduced to various types of poultry feeders. This practice leads to wastage of feed in initial stages when the chicks tend to soil them, spatter on the floor and the resulting bad hygiene may lead to diseases and mortality in the chicks. These practices increase labour and management cost.

Thus, a single feeder that would satisfy requirements of day-old chicks as well as growing of intermediate growth stage and fully and grown up birds, i.e. poultry feeders having duel use would improve the techno-economic efficiency of poultry farming.

Duel use has been disclosed by following poultry feeder Assemblies:

Swartzendruber (U.S. Pat. No. 4,476,811) achieved duel use of same poultry feeder assembly by providing the entry of the feed into the pan only at its peripheral portions when day-old chicks are introduced and then progressively as chicks grow up and can reach interior of the pan by closing the opening that lets feed to go to peripheral area and allowing the feed to get entry into the central area through another opening at the bottom of the drop tube means.

Cole et al (U.S. Pat. No. 4,995,343) achieved duel use by getting feed input from two feed gates, one on lower end and the other one at a higher up level in the feeder tube, ultimately to achieve a feed flooded position which is easier for the chicks to feed upon and lower feed levels for grown up birds.

Pollock et al in U.S. Pat. Nos. 5,311,839, 5,462,017, 5,718,187 disclosed duel use by the use of a generally vertically disposed rim (46) surrounding the outer portion of the feed pan and permitting relative movement between the feed pan and the feed tube between an extended position in which the feed tube is in its extended position and in which the rim extends up above the level of the feed pan thereby to aid in containing feed within the feed pan and a lowered position in which the feed pan rests on the floor and in which the rim is lowered with respect to the feed pan thereby to lower the height of the feed pan so as to permit young chicks or the like to readily view feed deposited within the feed pan and to have access to the feed therein.

Harwood et al (U.S. Pat. No. 5,778,821) provided duel access to chicks as well as birds by providing a conventional side opening on feeder tube which can be used in the feeding of small chickens.

Cheng (U.S. Pat. No. 5,957,083) achieved duel access to chicks as well as grown up birds by providing a coupling ring on the top of the feed carrier plate such that the feed carrier plate can be moved vertically relative to the coupling ring when the feeder is kept on the ground, thereby reducing the height which chicks are required to overcome to reach up to the feed; and when the chicks grow up, allowing the feed carrier plate to move below the coupling ring so that total height is increased. The capacity of the feed carrier plate is also enhanced by the height of the coupling ring and birds having greater height can comfortably eat for the same.

Kimmel et al (U.S. Pat. No. 6,050,220) achieved feeding chicks as well as birds with the same feeder assembly by achieving highest possible level of the feed in the pan when the poultry feeder is kept on the ground level, so that the chicks can see the feed and climb up into the pan to feed.

Cole et al (U.S. Pat. No. 7,107,932) also used high level of feed in the pan as the means for achieving feeding chicks as well as birds from the same feeder.

Tauline (U.S. Pat. No. 6,470,826) also achieved the objective of feeding chicks as well as birds in same feeder by resorting to flooding the pan with feed for feeding chicks.

Slankard et al (U.S. Pat. No. 7,647,888) also achieved duel use by achieving flood-type feeder mode and shallow-fill type feeder mode.

Thus, although the mechanisms were different in each the prior art designs generally used flooding of the pan of the feeders with feed as a means to achieve duel use of the feeders: for feeding chicks as well as birds.

However, all of these disclosures which have achieved duel use by several different mechanisms are based on achieving full flooding of the pan at such a level that chicks can see the feed and have easy access to the same. However, as specifically mentioned and acknowledged by Kimmel et al, with this kind of access to the feed, the chicks would climb up the pan and feed upon. This is like providing an arrangement which is analogous to making feed available on a paper or cardboard, upon which chicks can freely move about. It is known that this un-inhibited access leads to raking of the feed, and spattering it causing the feed to fall on the floor and also soiling of the feed in excreta of the chicks leading to wastage of the soiled feed and spreading of diseases on account of consumption of the soiled feed by many chicks leading to high rate of chicks mortality; both factors influencing the economics of the Poultry farming adversely. Hence, flooding the pan with feed is not a viable option for enabling use of the same feeder for chicks as well as growing and grown up birds—the duel use. An improvement was needed in the design of duel use feeders.

Below is described a prior art poultry feeder assembly, which has a Feeder Grill, the rim of which can be adjusted either to sit directly on the upper rim of the pan holding the feed or hang at upper position leaving an opening between the upper rim of the pan and lower rim of the Feeder Grill such that the space is enough for the chicks to have access to feed, however, the lower rim of the Feeder Grill would act as barrier for them to make it difficult to get into the pan greatly reducing the instances of chicks entering into the pan and soiling the feed. This design, in conjunction of a Feed Regulator and accessory features of the design for enabling control of feed supply in the pan, had several limitations. The height of the pan from the base of the feeder upto the upper rim of the pan was about 54 mm, Adding to that the thickness of ring at the base and the thickness of the lowermost tip of the Pillars, both of which added to the height of the rim of the Pan from the ground level, the total height was about 70 mm. This was not comfortable for smaller chicks of some breeds having smaller stature than other breeds at same age. Further, the pan was an integral part of the drop tube and unless the entire integral structure of pan plus the drop tube was dis-assembled at the end of the growing cycle from the feeder pipe, it was not possible to retrieve all the residual and leftover feed in the depressions of the pan and it was also extremely difficult to make satisfactory physical cleaning of the pan. Still further, the outer rim of the Feed Regulator was obstructive to the birds for having access to the feed, the leg space for the birds below the Feeder Grill was not adequate. Still further, for the purpose of giving strength, this rim was provided with a ring that press fitted into it from below surface [(9) in FIG. 14(A)], which increased cost as well as time required for assembly of the feeder. The structures named as pillars which supported the Feed Regulator as per requirement of mode of operation, had to be fixed at their lower end in a ring and then inserted into the sleeves to reach interior of the feeder below the Feed Regulator. This assembly was tedious. Overall, there were 11 parts in the prior art feeder and their assembly was tedious, labour consuming as well as time consuming.

Further, a Feed Closer meant for controlling the amount of feed dropping in the feeder from the feed pipe used to bend while opening and closing, a part which meant to prevent rotation of the feeder around the feeder pipe, Anti-rotation part, was not sturdy and could get broken. Still further, Version 1 was difficult to assemble and disassemble due to small size of the locking portion (36) (See FIG. 16A). Still further, the part Lock (14) [FIG. 5] of prior art Version 1 was weak and did not have enough tensile strength that was required for its working as a lock.

Objective of this invention was to improve upon the shortcomings of the prior art feeder identified above and described in details below for providing a easy to manage duel use feeder, which shall make it possible to use same feeder throughout the crop cycle right from feeding day old chicks to fully grown up birds and make cleaning at the end of the crop easy to carry out before next cycle of crop is taken. The term "crop" is used here to denote the batch of chicken that is raised from these day-old chicks stage to the fully grown up stage until the end of economic life of that batch.

Further, Version 1 Poultry Feeder Assembly had a total of 11 parts, which made assembling them that much complicated. Reduction in number of parts needed to be assembles was also desired simultaneous to design changes which would make job of making assembly from the parts more easy.

SUMMARY OF THE INVENTION

This invention comprises a Poultry Feeder Assembly (3) for providing access to feed to chicks of small breeds as well as growing and fully grown up birds from the same Poultry Feeder Assembly, provided with a barrier to minimize entry of the chicks inside a feed containing pan (25) of the Poultry Feeder Assembly, the said term "poultry" refers to chicken, known by its Latin name *Gallus gallus domesticus*, the said Poultry Feeder Assembly being attachable to a pipe that has means for automatic conveying of feed from a small hopper (2) to the Poultry Feeder assembly attached to the pipe, the pipe being named as "Feeder Pipe" (4), and the said Feeder Pipe is provided with a winch system or an analogous means for level adjustment or height adjustment from ground or floor of a poultry house; wherein, the pan means for holding the feed is separable for cleaning purpose from the tube that conveys feed received from a feeding pipe to the pan.

In one embodiment of this invention, the above said Poultry Feeder Assembly is attachable by a means for attaching the Poultry Feeder assembly to the Feeder Pipe and further comprising a means for controlling the amount of feed that shall drop from the Feed Pipe into the Poultry Feeder Assembly, a means conveying the feed dropping from Feeder Pipe into the Poultry Feeder Assembly, a means for holding the dropped feed and making it accessible for the chicks and birds for feeding upon, means having a height suitable for day-old chicks of small breeds, and means that adapt the Poultry Feeder Assembly to the progressively changing requirements of height, accessibility to the feed and leg space requirements as chicks grow up from day-old stage through intermediate stages of growth up to maximum growth required in a poultry farming.

In a further aspect, in the Poultry Feeder Assembly mentioned above, the means for attaching the Poultry Feeder assembly to the Feeder Pipe comprises a Feeder Cap (23) provided with a locking portion (36) and a device Anti-rotation (22) to prevent rotation of the Poultry Feeder assembly around the Feed Pipe.

In one further aspect of the Poultry Feeder Assembly, the means for controlling the amount of feed that shall drop from the Feed Pipe into the Poultry Feeder Assembly comprises (a) a Feed Closer (20), the means for conveying the feed dropping from Feeder Pipe into the Poultry Feeder Assembly comprises a tube, named as Drop Tube, the upper open end of which coincides or approximates beneath an opening of the Feeder Pipe on lower side of the Feeder Pipe beneath the point on which the Poultry Feeder Assembly is attached to the Feeder Pipe for receiving the feed conveyed by the automatic conveying arrangement of the Feeder Pipe, and has a lower end that is open above a central surface of a pan that receives this feed and allows the feed to get spread to the peripheral part of the pan (25), (b) the means for holding the dropped feed and making it accessible for the chicks and birds for feeding upon comprises a pan (25), and (c) the means that adapt the Poultry Feeder Assembly to the progressively changing requirements of height, accessibility to the feed and leg space requirements as chicks grow up from day-old stage to a full grown stage are provided by a group of features which comprises: (i) keeping height of the outer rim of the Feeder Pan convenient for access to the feed of day-old chicks of small breeds of Poultry also when the Poultry Feeder assembly is placed on the ground, (ii) providing a loosely fitting cylindrical part, named as a Feed Regulator (10), around lower part of the Drop Tube part that can freely move up and down along the height of the Drop Tube and be fixed as required at various locations along the movable path so as to provide a flexibility or variability in the space it encloses below the lower end of the Drop Tube, thus enabling control and regulation of the amount of feed coming out from the space below the lower end of the Drop Tube and become available to the feeding chicks in peripheral part of the pan as per changing requirement from the day-old smallest size of the chicks to fully grown size of the birds, (iii) a grill, named as Feeder Grill (19), around the Drop Tube which can slide to a limited extent along height of the Drop Tube and be positioned at desired locations such that it can reciprocate to the changing position of the Feed Regulator relative to the height of the Drop Tube and also can be brought down to rest on the rim of the Feeder Pan-cone if desired, and (iv) adjusting the height of the Poultry Feeder Assembly relative to the ground level as required during different growth stages of chicks and birds with help of adjusting the level or the height of the Feeder Pipe from the ground level.

The Poultry Feeder Assembly mentioned above comprises, in a further embodiment, a Feeder Pan that is not integrated with the drop tube and being detachable from rest of the Poultry Feeder Assembly attached to the Feeder Pipe so as to facilitate complete retrieval of unused feed at the end of feeding cycle of a batch of poultry and before start of the next cycle of feeding next batch of poultry in the same Poultry House using the same set up of semi-automatic feeding system.

In a further embodiment, the Poultry Feeder Assembly has the thickness of the Feed Closer such that it resists bending in repeated use in long run, the Drop Tube is integrated at its lower end with sleeves (28) that are open at both the ends and the sleeves are supported by a ring that is removably attached to the central portion of the base of the pan that holds the dropped feed (25), the term "removably" meaning thereby that the part is attached in assembled condition but can be removed when required to be dissembled. Further, the Drop Tube is integrated with sleeves and the entire part being named as "Drop Tube-Sleeves middle piece", the pan of which is integrated on at central portion of the upper surface with a cone the wide base of which is accommodated within the diameter of the ring formed by the sleeves and the tip of which extends into the inner space of the lower part of the Drop Tube thereby limiting the space available to the feed to that extent and ensuring that major portion of the dropped feed is conveyed to peripheral portion of the pan which receives the dropped feed and becomes available for the feeding chicks or birds; the part of the pan integrated with cone being named as "Feeder Pan-Cone" (25). The Feeder Pan-cone is provided with holes below the bottom holes of the sleeves to allow to pass through each sleeve a rod shaped device, named as "Pillar", the Pillar being meant for supporting the Feed Regulator at a position that is highest from the upper surface of the pan when the Poultry Feeder Assembly is placed on the ground. Feed Regulator is provided with wing shaped projections that extend into the space at the side of the Feed Regulator so as to divide the space available for the birds to feed and has Projection (29) at lower end that extends downwards and can be fixed as required at various locations along the movable path on Steps (30) which radiate as projections at the base of the sleeves and provide the point on which the lower end of the Projection (29) rests.

Feeder Grill being provided with two projections opposite to each other on two sides at its top end of inner perimeter directed towards the Drop Tube, the projections being engageable in and slidable along slots, the slots comprising (a) one or more pairs of elongated slots on the perimeter of the upper portion of the drop tube below the slot for Feed Closer, or (b) an Elongated Slot (37) on an elongated structure named as Lock (14), the Locking portion being located in an elongated depression provided for housing the Locking portion along the length of the Drop Tube, the two projections get engaged in one of the pairs of elongated slots specified above either in (a) or (b) when the Poultry Feeder Assembly is placed on the ground and the Feeder Grill gets pushed to uppermost position by the action of the Pillars, and the Feeder Grill being located at the lowermost end of the Elongated Slot (37) when the Poultry Feeder Assembly is lifted from the ground by winch system to hang at a height from ground and the Lock is pressed inside the depression below it thereby releasing the Feeder Grill form the notch when the Pillars come out of bottom and the Feeder Grill is allowed to drop to come to rest on the upper rim of the pan means The ring of the Poultry Feeder Assembly on which sleeves are attached is removably attached to the central portion of the base of the pan means by an arrangement that locks or unlocks by applying force. In the illustrated example this is achieved by clock-wise or anti-clockwise movement against the Feeder Pan-Cone, which can be achieved by any other mechanism too. This unlocking enables complete retrieval of residual feed by just unlocking the Feeder Pan-Cone from the rest of the part of the Poultry Feeder Assembly comprising Drop Tube-Sleeves middle piece still attached to the Feeder Pipe, making cleaning job very easy and labour saving. In the illustration, the holes provided to the Feeder Pan-Cone are three in numbers, the rod shaped devices also being three in number one in each hole. Each Pillar is provided with a snap lock so that while making assembly of the parts it can simply be pushed in from the base of the opening of the sleeves and comes out from the upper end and the snap lock opens and prevents it falling back again on its own thereby making assembly of the Poultry Feeder assembly very easy, and the same is of such a height that when the Poultry Feeder Assembly is kept on ground, they get inserted in the sleeves and push the Feed Regulator at uppermost position along the Drop Tube portion of the Drop Tube-Sleeves Middle Piece engaging the Feed Regulator in the Notch (35) in the middle of the Lock; thereby providing access to the chicks of small breeds also for feed through gap between the upper rim of the pan of the Feeder Pan-Cone. The Steps (30) are provided, in the illustrated example, as three pairs with three heights, which may vary in number if desired, each pair comprising steps being located opposite to each other along the circle formed by the base of the sleeves. The Feeder Grill comprises outer rim that projects upwardly and outwardly which in effect provides less resistance to grown up birds while getting access to feed on one hand and provides an additional distance from the base of the outward rim of the Feeder Pan-Cone, thereby, providing an additional leg space and comfort to the grown up birds while feeding.

In one embodiment, in the Poultry Feeder Assembly of this invention, the thickness of the Feed Closer is at least 3 mm, the height of the upper rim of the pan of the Feeder Pan-Cone does not exceed 54 mm, one pair of the Steps (30) has height of 19.8 mm, the second pair of the Steps has height of 24.8 mm and the third pair of the Steps has height of 29.8 mm.

In another embodiment, this invention comprises a Poultry Feeder Assembly (3) for providing access to feed to chicks of small breeds as well as growing and fully grown up birds from the same Poultry Feeder Assembly, provided with a barrier to minimize entry of the chicks inside a feed containing pan (25) of the Poultry Feeder Assembly, the term "poultry" refers to chicken, known by its Latin name *Gallus gallus domesticus*, the Poultry Feeder Assembly being attachable to a pipe that has means for automatic conveying of feed from a small hopper (2) to the Poultry Feeder assembly attached to the pipe, the pipe being named as "Feeder Pipe" (4), and the Feeder Pipe and is provided with a winch system or an analogous means for level adjustment or height adjustment from ground or floor of a poultry house, wherein, the Poultry Feeder Assembly comprises at least one or a functionally appropriate combination of two or more of following features, (a) the pan, named Feeder Pan, is separable for cleaning purpose from a tube, named as Drop Tube, that conveys feed received from the feeding pipe to the pan located below the Drop Tube, (b) height of the upper rim of the Feeder Pan, from the floor or ground of the poultry house, is convenient for access to the feed to day-old chicks of small breeds of Poultry also when the Poultry Feeder Assembly is placed on the ground, (c) the Drop Tube is integrated at its lower end with sleeves (28) that are open at both the ends and the sleeves are supported by a ring that is removably attached to the central portion of the base of the pan that holds the dropped feed (25), the Drop Tube integrated with sleeves being named as "Drop Tube—Sleeves middle piece", (d) the Feeder Pan is integrated on at central portion of the upper surface with a cone the wide base of which is accommodated within the diameter of the ring formed by the sleeves and the tip of which extends into the inner space of the lower part of the Drop Tube thereby limiting the space available to the feed to that extent and ensuring that major portion of the dropped feed is conveyed to peripheral portion of the pan which receives the dropped feed and becomes available for the feeding chicks or birds; the pan integrated with cone being named as "Feeder Pan-Cone" (25), (e) Feeder Pan is provided with holes below the bottom holes of the sleeves to allow to pass through each sleeve a rod shaped device, named as "Pillar", the Pillar meant for supporting the Feed Regulator at a position that is highest from the upper surface of the pan when the Poultry Feeder Assembly is placed on the ground, (f) the ring on which sleeves are attached is removably attached to the central portion of the base of the pan by an arrangement that locks or unlocks by clock-wise or anti-clockwise movement against the Feeder Pan-Cone, thereby enabling complete retrieval of residual feed by just unlocking the Feeder Pan-Cone from the rest of the part of the Poultry Feeder Assembly comprising Drop Tube-Sleeves middle piece still attached to the Feeder Pipe, making cleaning job very easy and labour saving, (g) each rod like structure that pass through the sleeves being provided with a snap lock so that while making assembly of the parts it can simply be pushed in from the base of the opening of the sleeves and comes out from the upper end and the snap lock opens and prevents it falling back again on its own thereby making assembly of the Poultry Feeder Assembly very easy, and is of such a height that when the Poultry Feeder Assembly is kept on ground, they get inserted in the sleeves and push the Feed Regulator at uppermost position along the Drop Tube portion of the Drop Tube-Sleeves Middle piece engaging the Feed Regulator in a Notch (35) in the middle of the Lock; thereby providing access to the chicks of small breeds also for feed through gap between the upper rim of the pan of the Feeder Pan-Cone, (h) a Feeder Grill in the shape of an inverted arcuate shaped basket comprising an outer rim that projects upwardly and outwardly which in effect provides less resistance to grown up birds while getting access to feed on one hand and provides an additional distance from the base of the outward rim of the Feeder Pan-Cone, thereby, providing an additional leg space and comfort to the grown up birds while feeding,

BRIEF DESCRIPTION OF FIGURES AND LEGENDS

Wherever dimensions as shown in the figures, they are in mm (millimeters) and are illustrative only and are not be construed as limiting the claims. Actual dimensions may vary depending upon the overall size of the Poultry Feeder.

FIG. 1: General layout of Poultry Feeder Assembly line

FIG. 2: General layout of feeder assembly line in a poultry house

FIG. 3: Perspective view of Assembled Poultry Feeder Assembly prior art Version 1

FIG. 4: Perspective view of Assembled improved Poultry Feeder Assembly Version 2

FIG. 5: Exploded view of part details: Poultry Feeder Assembly prior art Version 1

FIG. 6: Exploded view of part details: Improved Poultry Feeder Assembly Version 2.

FIG. 7: Vertical section view showing all parts and feed (indicated by dotted portion) of feeder version 1.

FIG. 8: Vertical section view showing all parts and feed of feeder version 2.

FIG. 9 A: Feeder Pan-Drop Tube of version 1 (13) of [FIG. 5, prior art version 1] and Cone below it.

FIG. 9 B: Feeder Pan-Cone (25) and Drop tube-Sleeves middle piece (24) of [FIG. 6, improved version 2]

FIG. 10 A: Exploded view of vertical section through FIG. 9A passing through the center of Feeder Pan-Drop Tube and the Cone that is a separate piece that rotate-ably and slide-ably fits below it.

FIG. 10 B: Exploded view of vertical section through FIG. 9B Drop Tube-Sleeves Middle Piece (25) of [FIG. 6, improved version 2] and Feeder Pan-Cone which is a single piece composite of the "Feeder Pan" and the Cone.

FIG. 11 A: Feeder Pan-Drop Tube (13) of [FIG. 5, prior art version 1] and Cone (18) of [FIG. 5, prior art Version 1]; wherein the pan and the cone are two separate pieces, and Feeder Pan and the Drop tube are integrated into a single piece.

FIG. 11 B: The Feeder Pan-Cone (25) of [FIG. 6, Improved Version 2] wherein the "Feeder Pan" part and the "cone" are integrated into one single part.

FIG. 12 A: Pillar version 1 (12) [FIG. 5 part assembly of prior art Version 1] showing requirement of a ring (17) of [FIG. 5, prior art version 1] for their assembly with the feeder.

FIG. 12 B: Pillar version 2 (21) [FIG. 6] part assembly of improved Version 2 showing design change—i.e. addition of a Snap Lock (26) which makes their assembly with the sleeves easy and the snap lock working as non-return obstacle, the pillars cannot come out of the base and there is no necessity of a ring at the base to attach the lower ends of the pillars to stabilize them.

FIG. 13 A: Showing inadequate thickness T of part Anti-rotation part version 1 (15) [FIG. 5 of prior art Version 1] that is not enough and breaks sometimes.

FIG. 13 B: Showing thickness T of part Anti-rotation part version 2 (22) [FIG. 6 of improved Version 2] which is increased to add strength. The size of the slot H has also been changed to facilitate the feed to fall easily into the pan.

FIG. 14 A: Showing that the Feeder Grill version 1 (8) [FIG. 5, prior art version 1] part requires grill Extension Ring (9) [FIG. 5, prior art version 1] (the Extension Ring shown here detached from the grill, which, in FIG. 3 is a part that press fits the visible portion of the grill ring from underneath to add to the mechanical strength of the rim of the Feeder Grill). Also note that the rim turns inwards at the periphery, which has been seen to obstruct the birds for an access to the feed.

FIG. 14 B: Showing design change in "Feeder Grill" version 1 (8) [FIG. 5] made in the improved Version 2 that has eliminated the need of Extension Ring part (9) [FIG. 5, prior art version 1]. This figure also shows design change in the rim of the Grill part that has, now, outwardly projecting saucer like shape which has made access to the feed easier for the birds.

FIG. 15 A: Shows the part "Feed Closer" version 1 (11) [FIG. 5] of prior art Version 1 the thickness of which needed increase to improve strength.

FIG. 15 B: Shows the part "Feed Closer" version 2 (20) [FIG. 6] of improved Version 2 wherein thickness "T" has been increased to add strength to the part.

FIG. 16 A: Shows the part "Feeder Cap" version 1 (16) [FIG. 5] of the prior art Version 1 which is difficult to assemble and disassemble due to small size of the locking portion (36) [FIG. 16A].

FIG. 16 B: Shows the part Feeder Cap (23) [FIG. 6] of the improved Version 2 wherein the design is improved for easy fit and easy removal from feeder assembly due to size of the locking portion (36) considerably increased.

FIG. 17 A: Shows the part Lock (14) [FIG. 5] (lock strip at one side of the Drop Tube) of the Version 1 which had low strength and stiffness due to its construction i.e. its geometry.

FIG. 17 B: Shows the part Lock (14) [FIG. 6] of improved Version 2 wherein a Rib "R" is added to improve the strength of lock part, which has also increased the stiffness. (lock strip at one side of the Drop Tube).

FIG. 18: Shows a "Feeder grill" version 2 part of the Poultry Feeder Assembly (19) of FIG. 6

FIG. 19: Shows top view and perspective view from side of the "Feed regulator" part of the Poultry Feeder Assembly (10) of FIG. 6

Figure 20:
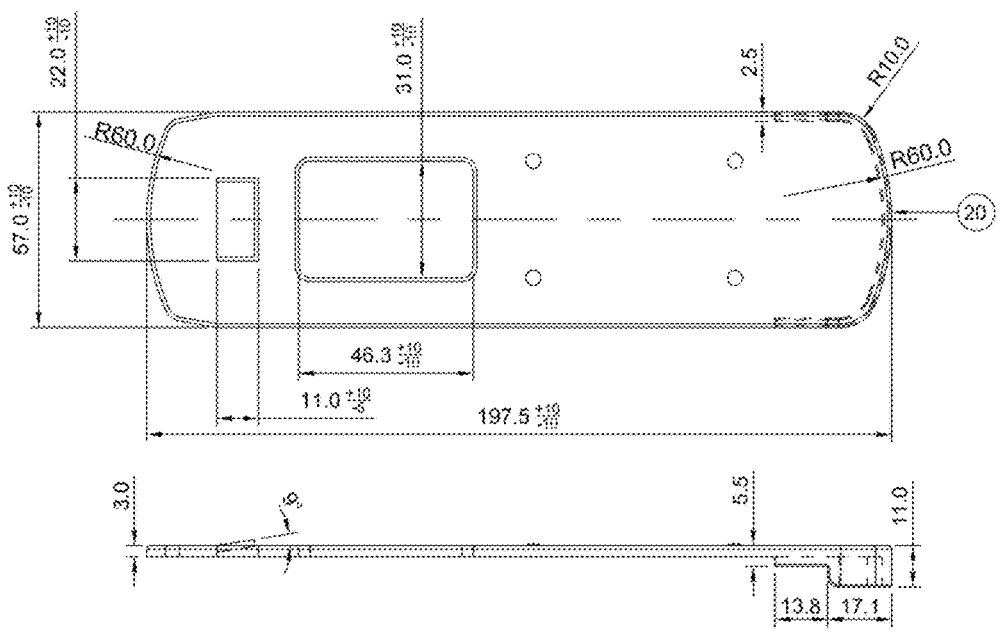

FIG. 20: Shows top view and perspective view from side of the "Feed Closer" version 2 part of the Poultry Feeder Assembly (20) of FIG. 6.

Figures 21A, 21B:
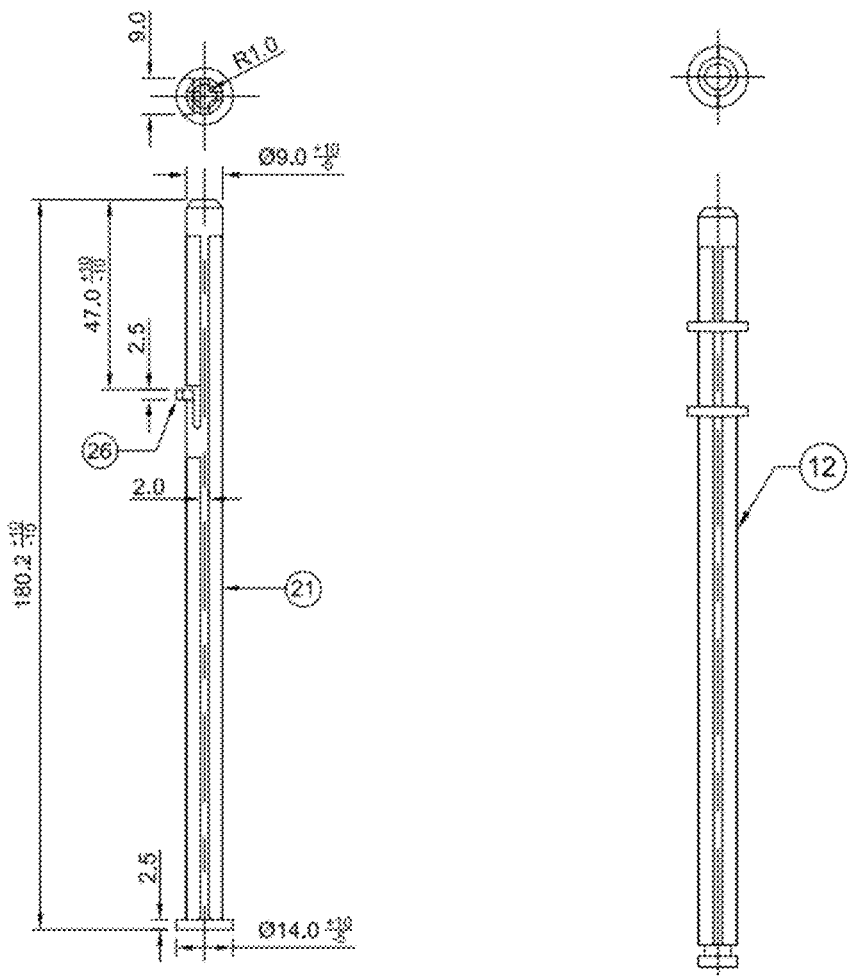

FIG. 21 A: Shows top view and perspective view of Pillar version 2 part of the Poultry Feeder Assembly (21) (of FIG. 6) with snap lock (26)

FIG. 21 B: Shows top view and perspective view of Pillar version 1 part (12) of the Poultry Feeder Assembly of FIG. 5; note that the pillar is without snap lock.

Figure 22:
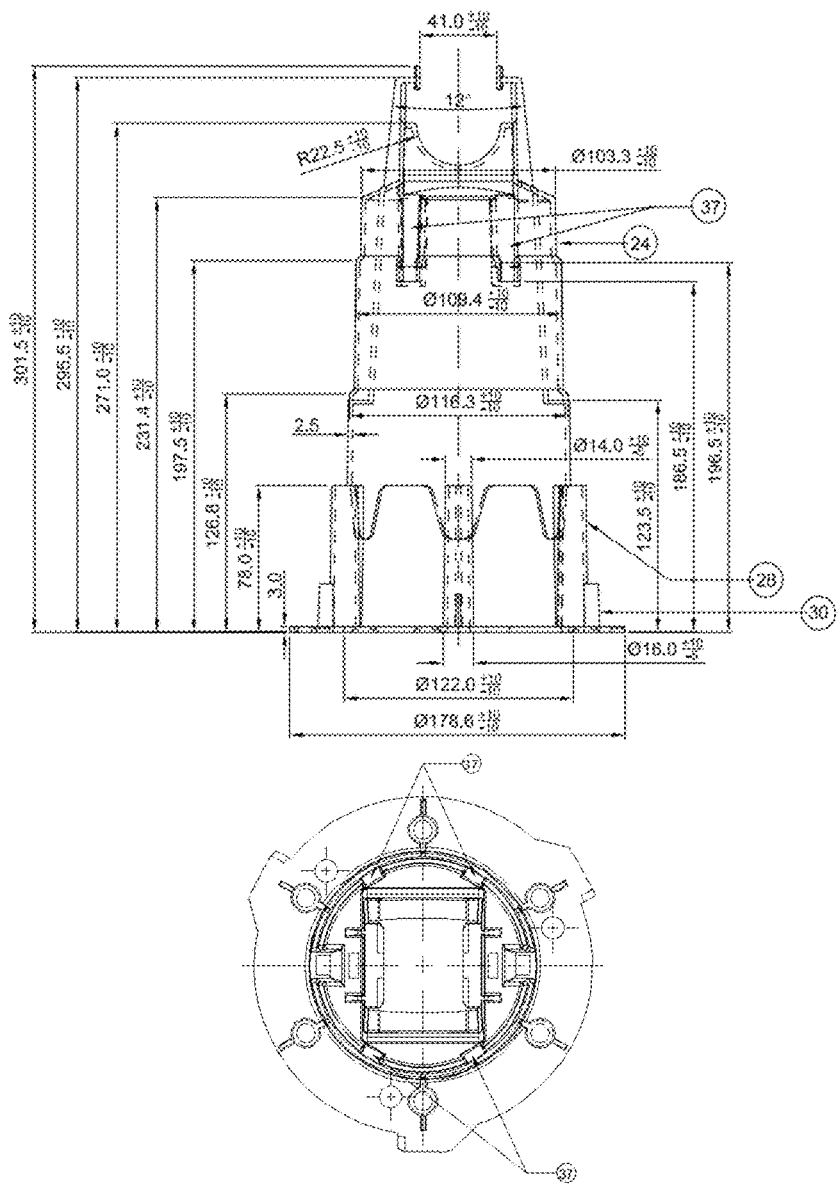

FIG. 22: Shows "Drop tube" part of the Poultry Feeder Assembly.

Figure 23:
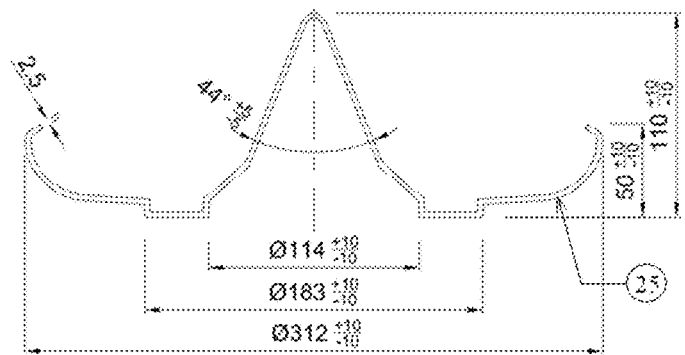

FIG. 23: Shows vertical section of a "Feeder Pan-Cone" (25) of FIG. 6

Figure 24:
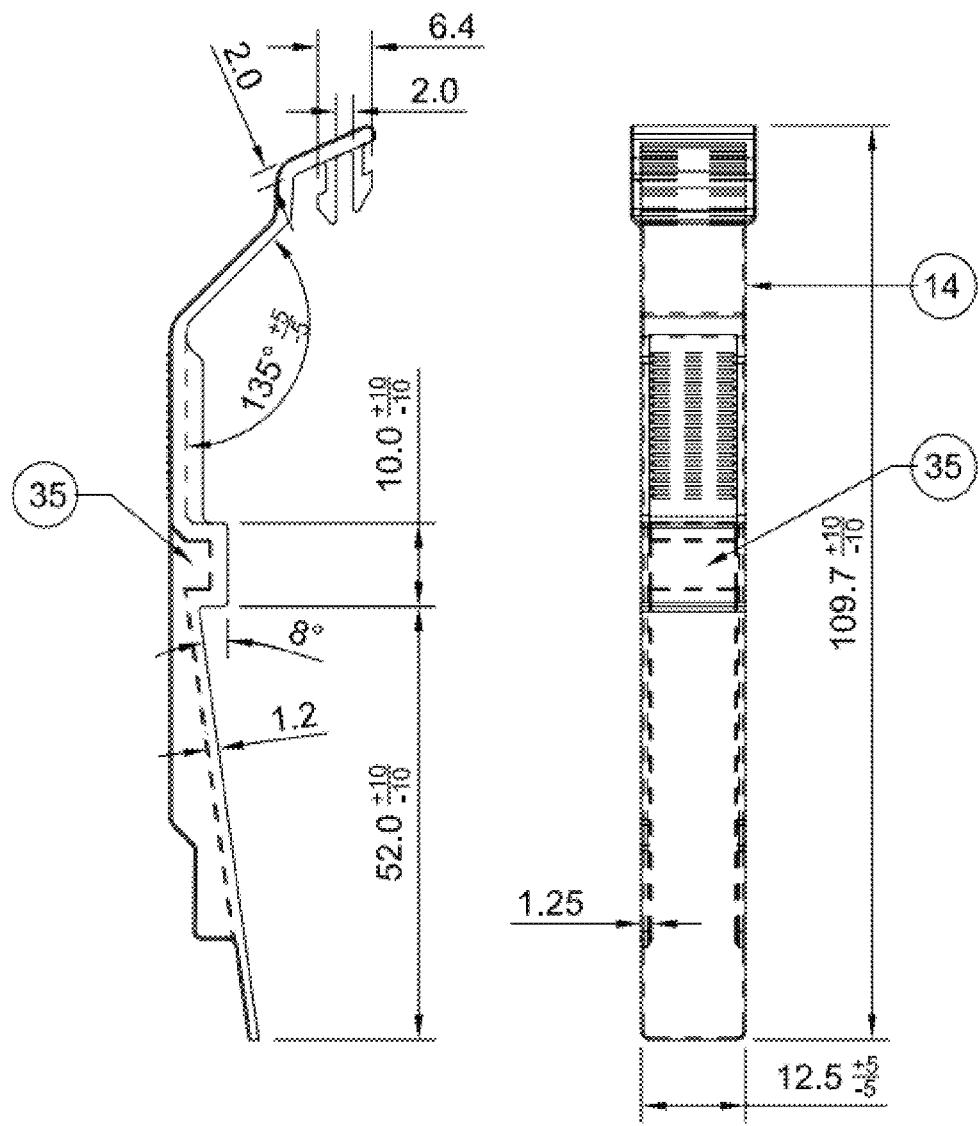

FIG. 24: Shows lateral and front view of lock part of the Poultry Feeder Assembly.

Figure 25:
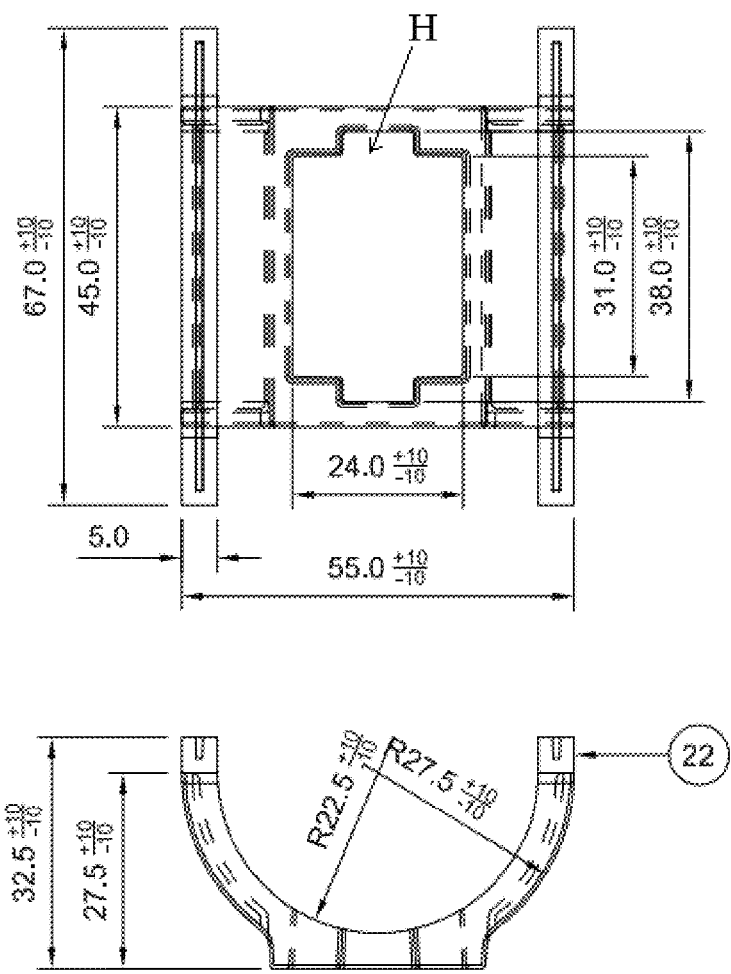

FIG. 25: Shows top and cross sectional view of the "Anti-rotation part" version 2 of the Poultry Feeder Assembly.

Figure 26:
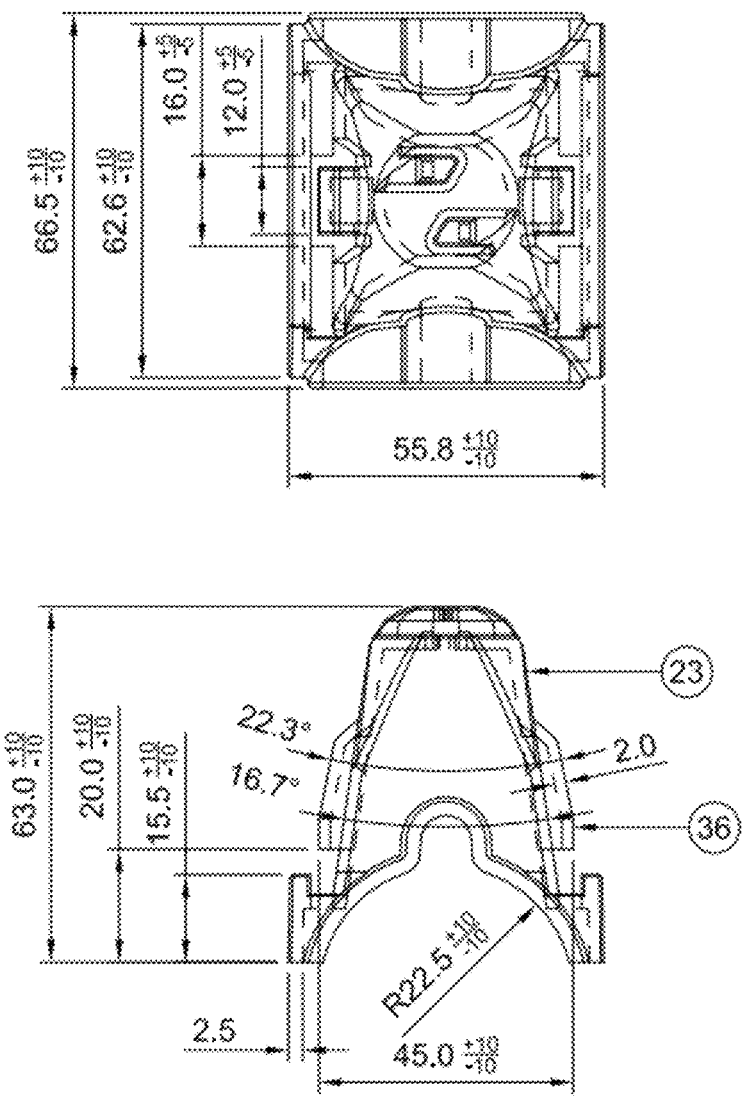

FIG. 26: Shows cross sectional view of the "Feeder Cap" version 2 part of the Poultry Feeder Assembly.

Figure 27:
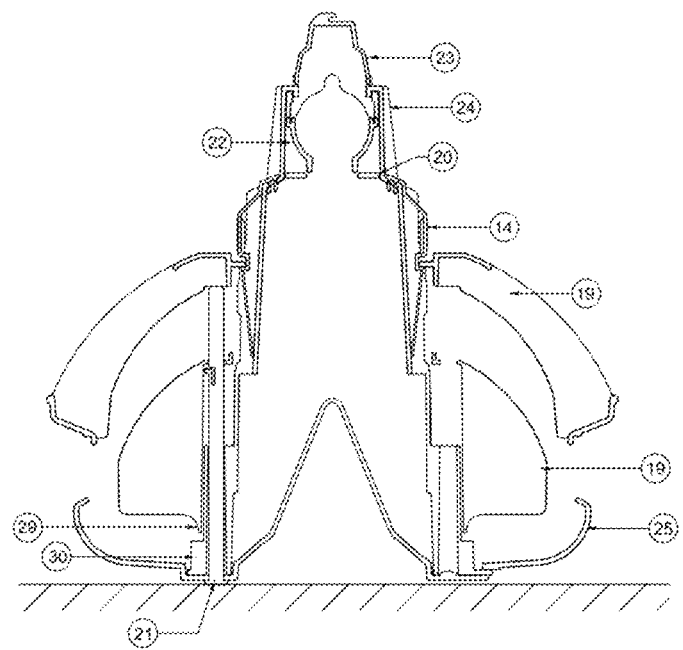

FIG. 27: Shows vertical section of Feeder Pan Assembly version 2 when feeder pan touches the ground. Note that the pillars are fully pushed inside and the Feed Regulator is lifted up from the Step (30) and can be adjusted for highest clearance by choosing appropriate alignment of the Feed Regulator around the Feed Tube and with relation to the Steps below it.

Figure 28:
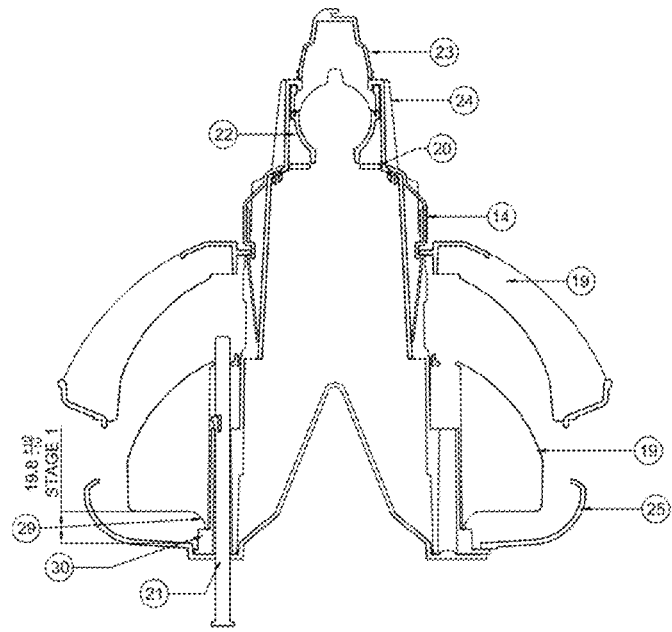

FIG. 28: Shows feed regulator operating at lowest clearance of its lower rim from the top surface of the pan (slot one (31) in [FIG. 19], stage 1). Note that the pillars have fully come out from the bottom of the Feeder Pan-Cone part in the illustrative embodiment, this clearance is 19.8 and there is a gap between the rim of the Feeder pan-Cone and the rim of the Feeder Grill.

Figure 29:
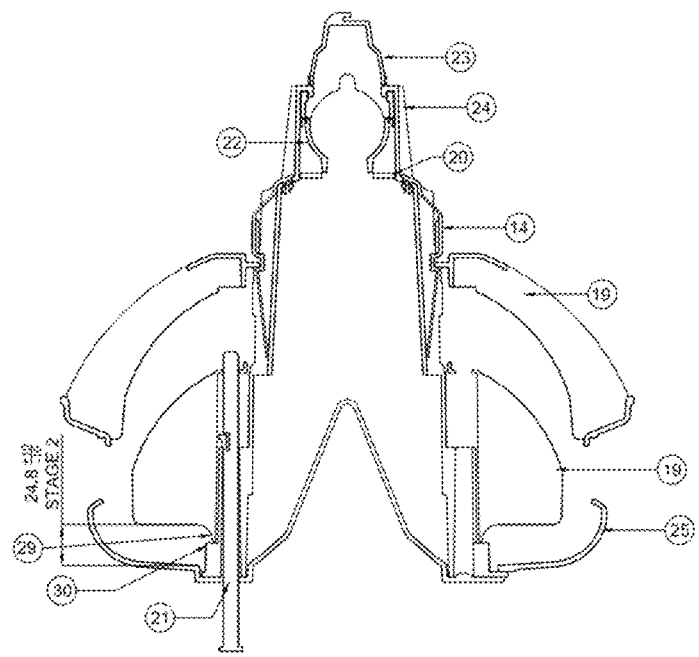

FIG. 29: Shows feed regulator operating at medium clearance of its lower rim from the top surface of the pan (slots two (32) in [FIG. 19], stage 2). Note that the pillars have fully come out from the bottom of the Feeder Pan-Cone part. In the illustrative embodiment, this clearance is 24.8 and there is a gap between the rim of the Feeder pan-Cone and the rim of the Feeder Grill which is enough for the chicks to get access to the feed by inserting their heads within the pan, but the lower end of the outer rim of the Feeder Grill prevents them from spoiling the feed by jumping and getting inside to pan and soiling the feed.

Figure 30:
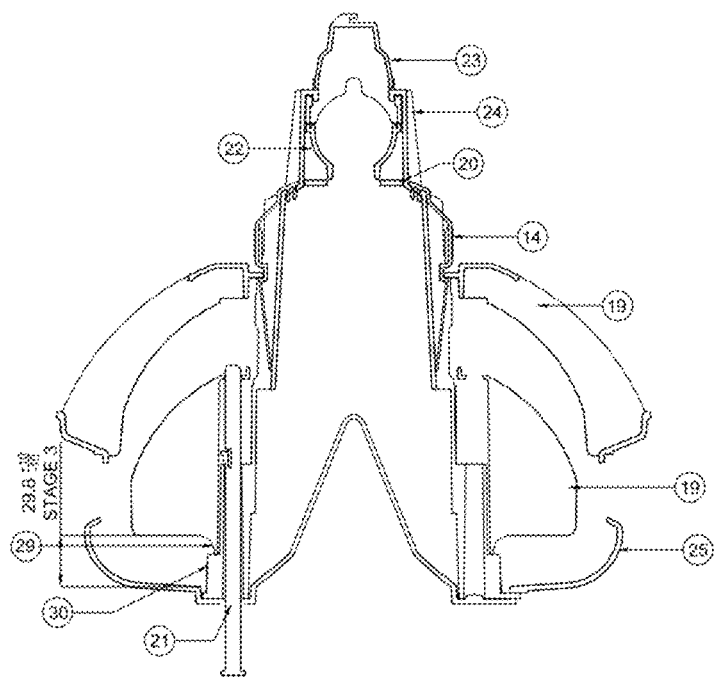

FIG. 30: Shows Feed Regulator operating at highest clearance of its lower rim from the top surface of the pan (slots three (33) in [FIG. 19], stage 3). Note that the pillars have fully come out from the bottom of the Feeder Pan-Cone part. In the illustrative embodiment, this clearance is 29.8 and there is a gap between the rim of the Feeder pan-Cone and the rim of the Feeder Grill.

Figure 31:
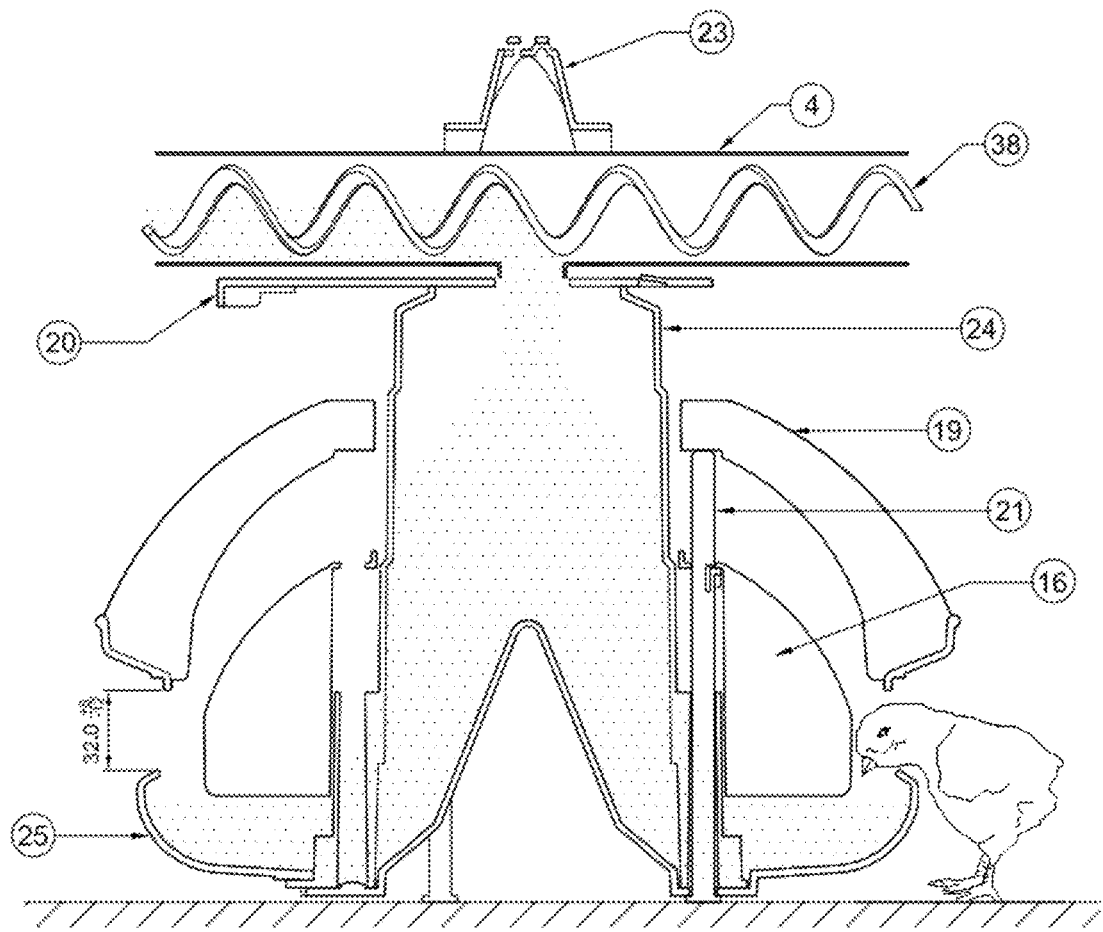

FIG. 31: Operating stages of poultry feeder: Feeder grill version 2 (19) [FIG. 6] at up position when it is kept on ground. Note that chicks can comfortably have access to feed through the gap between the rim of the Feeder pan-Cone and the rim of the Feeder Grill.

Figure 32:
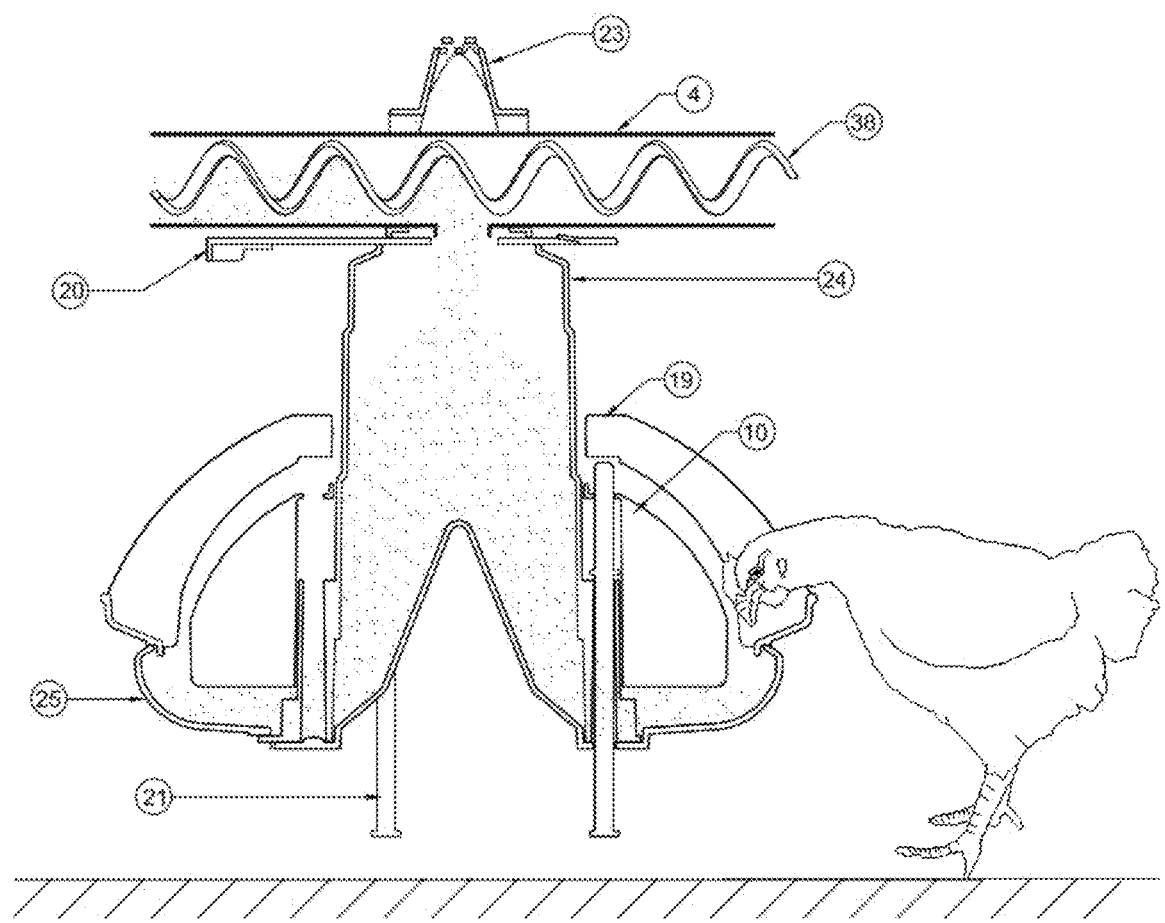

FIG. 32: Operating stages of poultry feeder: Feeder grill version 2 (19) [FIG. 6] when it is drop down and touches the top face of Feeder Pan (25) position. Note that here the Poultry Feeder Assembly is hanging above the ground, the pillars have fully come out, the Feeder Grill is at its lowermost position around the Feed Tube, lower portion of its rim is touching the upper part of the rim of Feeder Pan-Cone leaving no gap in between; which is the position in which same Poultry Feeder Assembly can be utilized for feeding grown up chicken.

Thus total number of parts in prior art Version 1 of the Poultry Feeder Assembly are 11; whereas the improved Version 2 of the Poultry Feeder Assembly has less number of parts, than the prior art version, i.e. a total of 9, so that the assembly of improved Version 2 of the poultry feeder becomes less complicated.

LEGENDS (1) Wire rope, (2) Small Hopper, (3) "Poultry feeder Assembly", (4) "Feeder Pipe", (5) Winch, (6) Drive Unit, (7) Big Hopper, (8) "Feeder Grill" version 1, (9) Feeder Grill Extension Ring, (10) "Feed Regulator", (11) "Feed Closer" version 1, (12) Pillar version 1, (13) "Feeder Pan-Drop Tube", (14) Lock, (15) Anti-rotation part version 1, (16) "Feeder Cap" version 1, (17) "Feeder Ring", (18) "Feeder Pan-Cone", (19) "Feeder Grill" version 2, (20) "Feed Closer" version 2, (21) Pillar version 2, (22) Anti-rotation part version 2, (23) "Feeder Cap" version 2, (24) "Drop Tube-Sleeves middle piece", (25) "Feeder Pan-Cone", (26) "Snap lock", (27) "Inner Rim", (28) Sleeve, (29) Projection of Feed Regulator, (30) Step, (31) One Slot (32) Two Slot (33) Three Slot (34) Hole through which pillar passes, (35) Notch, (36) Locking portion, (37) Elongated slot, (24 A) "Drop tube portion integrated with pan, (38) Auger.

DETAILED DESCRIPTION OF THE INVENTION

A poultry feeding system in a semi-automated poultry house, as shown in FIG. 1, generally consists, in general, of an equipment assembled from several parts designed for facilitating dispensing feed for the birds in a pan for eating named here as a "Poultry Feeder Assembly" (3) the Poultry Feeder Assembly is connected to a feed conveying pipe/tube (4) in which a spiral auger (38) in [FIG. 31] is used to move and dispense the feed. The height of the pan is adjustable using winching system (5) and rope (1) suspension system to allow height adjustment as per requirement of small chicks as well as birds to make them convenient to eat the feed in the pan according to their height at respective point in respective time. Thus, when chicks are small, the Poultry Feeder Assembly are set closest to the ground at a height suitable for the chicks, after few weeks as the birds grow the height of pan is raised to better accommodate increasing height of the birds as the birds grow. A series of such Poultry Feeder Assemblies are attached to the feeding line at equal interval.

FIG. 2 shows an illustrative poultry house with a semi-automatic system of a series of Poultry Feeder Assemblies. The system consists of a big hopper (7) in [FIG. 2] in which feed is stored in bulk, the big hopper is located outside of the house. This feed is then conveyed to the small hopper (2) which is connected to Feeder Pipe (4). A drive unit (6) [FIG. 2] is attached to the Feeder Pipe (4) [FIG. 2]. When motor of this drive runs it makes auger (38) in [FIG. 31] to rotate along with it and this causes the feed from small hopper to fall in to the individual feeder pan through a part of the Poultry Feeder Assembly, which is named here as "Drop Tube". The entire assembly of feeding system is hanged using wire ropes (1).

The height of the feeding system is changed using these ropes and winching system.

In the description below, the "version 1" is the prior art version; and "Version 2" is the embodiment of this invention.

It is very much conceivable that out of several inventive improvements disclosed below, only one or a selective combination of the inventive improvements described below is made in the Version 1 and brought in use. Each such version is covered within the scope of the disclosure as inventive version although the illustrated figures are not intended to illustrate each of such combination of prior art features and the claimed inventive features.

FIG. 5 shows the exploded isometric view of assembly, parts of a version 1 Poultry Feeder Assembly, FIG. 7 is a diagrammatic representation of vertical section through the Version 1, which is a prior art version on which this invention has made a number of improvements removing its defects thereby.

Version 1 has at its base, a cone shaped part—"Cone" (18) (see FIG. 5) that fits remove-ably but snuggly into an opening at the base of another part named for the purpose of this specification as "Poultry Feeder Pan-Drop Tube" (13) which combines in itself a pan at the bottom with a tube, a "drop tube", which is located on the top surface of the pan and extends to upwards; the pan is meant for holding the feed for chicks/birds and the "drop tube" communicates with the opening of the feed pipe which conveys feed to each Poultry Feeder Unit and the feed gets dropped from the feeder pipe into the pan of this part through the "drop tube". The fitment of the Cone (18) may be achieved by several mechanisms known in the art. In the currently illustrated Version 1, this is a sliding arrangement in a clock-wise and anti-clockwise direction which results it's locking and unlocking with a Feeder Pan-Drop Tube (13). The Feeder Pan-Drop Tube is a one piece structure having a pan the bottom of which has an opening that accommodates the Cone when it is slide-ably locked with the "Feeder Pan-Drop Tube" part, the opening being bordered by the inner rim (27) of the "Feeder Pan-Drop Tube". The inner rim has sleeves (28) affixed vertically at the upper side of the rim. Each sleeve opens at the bottom end, through the inner rim, as well as on their top end. In the current Version 1 there are six sleeves spaced equidistance on the inner rim of the Feeder Pan-Drop Tube. To the sleeves, from inner side, is permanently fixed a tube, named as the "Drop Tube" (24). The "Drop Tube" is a tube that is open at lower end, stepwise goes on narrowing at the upper end and is attached at the upper end with a "Feeder Cap" (16) allowing the Feeder Pipe (4) (See FIG. 2) to pass through a complimentary opening that is provided between the Feeder Cap and the Drop Tube. The Feeder Cap is also attached to the rope (1) that connects the Poultry Feeder Assembly to the winching system (5). Near the top, when opening of the Feeder Tube is in communication with the opening of a feed the Feeder Pipe (4) which conveys the feed from the small hopper (2) to the Poultry Feeder Assembly connected to it, the feed conveyed through the pipe by means of an augur drops into the Feeder Pan-Drop Tube through this Drop Tube portion of each Poultry Feeder Assembly. Between these two openings is a part named as "a Feed Closer" (11), which is a strip that can slide to and fro, and has an opening complimentary to the opening as required to control when feed should drop in "Feeder Pan-Drop Tube". When the complimentary opening of the Feed Closer coincides with the openings of the Feeder pipe and the Drop Tube, the feed is conveyed through the pipe falls into the Feeder Pan through the Drop Tube; and when the complimentary opening in the strip does not coincide with the openings of the Drop Tube and the Feed Pipe, the feed is prevented from falling down through the Drop Tube.

Through the sleeves of the "Feeder Pan-Drop Tube", pass the "Pillars" (12). In the illustration, there are three numbers of pillars. In Version 1, which is the prior art version, the Pillars are rods that are remove-ably fixed at their lower end to a ring (i.e. fixed to the ring at their lower ends but are removable) that supports all the pillars and connects them to each other through the common ring. On the other end, these pillars pass through holes (34) of a Feed Regulator (10) (FIG. 19).

The "Feed Regulator" is a cylindrical shaped structure that has wings, wing like extensions, which extend into the space above the circular feed space of the "Feeder Pan-Drop Tube". The Feed Regulator fits slide-ably around the Drop Tube (24). The wings help, in combination with Feeder Grill (8), in dividing that space to avoid overcrowding of the birds. Wings also help in preventing raking of the feed by the birds, thereby preventing spoilage of the feed and the feed spilling and spattering on the floor of the poultry house and getting contaminated with fungi and bacteria leading to unhygienic conditions.

The Feed Regulator has two downward projections (29) at opposite side on its lower periphery (FIG. 8 and FIG. 19) which rest on the outward and vertical steps (30) that radiate outwards from the side at the base of the sleeves (see FIGS. 7, 8, 22). The height of these vertical steps of the opposite side of sleeves is same; Out of three pairs of sleeves opposite to each other fixed on the rim, one pair has vertical step having least height of about 12.5 mm, the next pair to it has vertical step having medium height of about 17.5 mm and the last pair has vertical step having highest height of about 22.5 mm. Thus, by choosing on which pair of vertical steps should the horizontal outward projections (29) of the Feed Regulator should rest, it is possible to choose the clearance of the lower rim of the Feed Regulator from the upper surface of the "Feeder pan-Drop Tube"; and consequently it is possible to choose how much of the feed in the Drop Tube should come out from that clearance for access of the birds. FIGS. 28, 29 and 30 show the three positions in which the Feed Regulator can be adjusted to vary the clearance of the lower rim of the Feed Regulator from the upper surface of the pan below it. To help making the choice of the pair of vertical projections on which the Feed Regulator should rest, the Feed Regulator is marked with one vertical slot (31) (FIG. 19) mark that coincides with the position of pair of vertical step having lowest height, with two slots (32) that coincide with the position of pair of vertical step having medium height and with three slots (33) that coincide with the position of pair of vertical step having highest height. When Feed Regulator rests on the lowermost level, it allows least gap between the Feeding Pan bottom and the lower rim of the Feed Regulator which provides/allows least flow of the feed granules to come out from the inner space of the Feed Regulator to outer space in the Feeder Pan-Drop Tube so that birds can eat the feed. This level is usually chosen to feed chicks which are too small and need only a limited quantity of feed. As the birds grow up, the Feed Regulator is made to rise progressively, initially on the higher second level and finally on the third level. Thus according to the age of birds the volume of feed in the pan can be adjusted in three levels. To change the position of slots, the Feed Regulator has to be raised above the tip of the three pillars and then after choosing the desired slots, again engaged through holes in the upper rim of the Feed Regulator. For raising the Feed Regulator over the tip of the three pillars, often it is necessary to temporarily lift a Feeder Grill, described in details below, located over it by handling the locks which are also described below in greater details.

To prevent the Poultry Feeder Assembly to rotate around the pipe due to the pushing movement of the birds, a part (15) named "Anti-rotation", is provided which engages with the slots of the pipe in such a way that the accidental rotation around the pipe is prevented. The opening in Anti-rotation part coincides with slot of the Feeder Pipe so that the feed conveyed through the Feeder Pipe drops through these slots into the Drop Tube.

Just beneath the Anti-rotation part is a slot meant for a Feed Closer (11) to shut and open, as per choice, the access of the feed to drop down through the Drop Tube via the slot of Anti-rotation part. This part, Feed Closer, was a very important improvement of the prior art version over earlier conventional Poultry Feeder Assemblies because this choice made it possible that all the Poultry Feeder Assemblies could be arranged in the system right from the day chicks were let in and one can chose how many Poultry Feeder Assemblies should have access of the feed depending on the stage of growth of the flock of birds. This greatly reduced management problems.

At the bottom end, the Drop Tube extends upto the upper tip of the Cone (18). Thus, when feed drops through the Drop Tube, it occupies the inner space of the Drop tube, falls over the Cone and the Cone makes it to slide sideways around itself into the upper surface of the Feeder Pan on the inner space and comes in the outer space of the pan through the gap between the bottom of the Feed Regulator and the upper surface of the Feeder Pan. As explained already, this gap can be regulated by selecting a level on which the Feed Regulator should rest upon.

Around the Drop Tube is slidingly fitted a Feeder Grill (8) which can slide along the height of the Drop Tube and stops are provided to it at two positions along the height of the Drop Tube by means of a Lock (14). The Lock is made by using two strips that fit on two sides of the Drop Tube lengthwise in complementary depressions beneath the rim of the Feeder Grill that slides around the Drop Tube. The two locks are fixed to the body of the Drop Tube at their upper and lower end, and middle portion remains free and projects a little above the periphery of the Drop Tube. The middle portion has enough tensile strength on account of which when pressed in the depressions below them, they buckle inside the depressions, and when released they project outside the surface of the periphery of the Drop Tube. The lock also has, in the middle, a notch (35) in [FIG. 24] in which the Feeder Grill can rest. The Feeder Grill, being slidingly (can be made to slide over by application of pressure) fitted over this lock, can be positioned either in the middle of the locks by engaging the Feeder Grill in that notch, or by sliding up to the upper end or up to the lower end of the locks. The desired positioning being facilitated by pressing the locks to make them buckle in the depression or dip inside the depression below them, sliding the Feeder Grill at desired position over the locks and then releasing the pressure on it so that the locks arrest further movement of the Feeder Grill and make them stationary at the adjusted position. Availability of this variability in positioning the Feeder Grill is useful to provide flexible height of the Feeder Grill according to the height of the birds that are required to be fed as they keep on growing. The Feeder Grill provides compartments along the peripheral space above the Feeder Pan so that overcrowding of birds is avoided and only a reasonable number of birds get access to the feed through the compartments of the Feeder Grill. Also the grill prevents the chicks as well as birds from getting into the feeder, prevent standing over the feeder and consequently soling of the feeders gets prevented.

The Feeder Pipe (4) has an auger (38) which helps in automatic distribution of pelleted feed from a small hopper (2) in [FIG. 2 General layout of Poultry Feeder Assemblies in poultry house]. The small hopper in its turn is fed automatically from a big hopper. (7) in [FIG. 2].

Thus, Version 1 of the Poultry Feeder Assembly provides a number of options for feeding of the birds which are not available in conventional Poultry Feeder Assemblies. In conventional Poultry Feeder Assembly, the height of the Feeder Pan is fixed. Hence, the Feeder Pans are used only for grown up birds and separate arrangement needs to be made for the chicks, wherein the feed is placed in shallow plates. This usually leads to lot of wastage as chicks tend to spatter it and also they go in the pans/plates, soil them and cleanliness is also adversely affected. In Version 1, when the chicks are small, the feeders are kept resting on the ground. In this position, the ring at the base of the pillars pushes the pillars upwards, and the pillars in their turn have such a height that it pushes the Feed Regulator at uppermost position along the Drop Tube or in relation with the Drop Tube, and the Feeder Grill is adjusted to engage in the notch (35) in [FIG. 24] that is located in the middle of the lock. In exceptional cases, if Feeder Grill is desired by user to be fixed at a level higher than the notch (35) in [FIG. 24] provided on the lock, for that purpose two pairs of elongated slots (37) in [FIG. 12 B] are provided on the upper portion of Drop Tube on the perimeter below the feed closer, one of them is located on the at same level as notch of the lock in an assembled poultry feeder of this invention and the other one at a level higher than the notch (35). This adjustment, if desired, is required to be done manually.

This adjustment of engagement of the Feeder Grill in notch 35 provides access to the chicks to the feed through the wide gap between the upper rim of the Pan and the lower rim of the Feeder Grill (see in [FIG. 31]). In one embodiment of this invention, this gap is kept such that the chicks of even smallest breeds can reach up to the feed conveniently, but it prevents them from getting up and inside the pan. This gap, in the illustrated Poultry Feeder Assembly is about 32 mm. As the chicks grow up, as required, the Feeder Pan assembly can be lifted up from the ground level with help of the ropes on which they can hang and the level at which they should hang can be adjusted with help of the winching system. When the birds grow further, they find it inconvenient to feed through the gap between the upper rim of the pan and lower rim of the Feeder Grill. At this stage, the Feeder Grill is disengaged and is allowed to drop to the lower end of the lock, wherein the rim of the Feeder Grill now rests on the rim of the pan and now the grown up birds can conveniently feed through the wide gaps in the grill provided at a convenient height to the mid-sized birds. When birds grow further in height, As described earlier, all throughout the feeding period, the quantity of feed that comes out from beneath the Feed Regulator to the pan, the Feed Regulator can be adjusted to one of the three positions (FIGS. 28, 29 and 30) provided by the three pairs of vertical steps (30) radiating outwards from the side of the sleeves. Thus, same feeder could be used from the chick stage to fully grown up stage, which is highly advantageous for poultry management in semi-automatic system. Cleanliness as well as optimum access to the feed could be efficiently managed for all stages of poultry feeding, right from day-old-chicks stage to the fully grown up birds on the day of their disposal through a combination of choosing appropriate position of the Feeder Grill, Feed Regulator and position of the Feeder Assembly with respect to the ground level by operation of the winching system. This provided a breakthrough in Poultry management as compared to the conventional system wherein different types of pans had to be used for different stages of the birds, yet it was found difficult to achieve cleanliness or/and adjustable access to feed in quantity as well as convenience of feeding at optimum height.

Although Version 1 had a number of advanced features when compared to the conventional feeders, in course of time however, some limitations were identified as described below.

When one crop from chick stage up to fully grown up birds is over and the birds are disposed off, that is the time when the cleaning is done for starting the next crop. One of the operations involves cleaning of the Feeder Assembly for removing the residual leftover feed from it. In Version 1 this cleaning of the residual leftover feed was being done by disengaging the Feeder Pan-Cone (18) in [FIG. 5] from bottom by rotating away from the Feeder pan-drop tube (13) in [FIG. 5]. This allowed excess feed that has remained un-utilized in the Drop Tube to be removed/recovered conveniently; however, recovering the feed from the depression in the pan of the Feeder Pan-Drop Tube and physical cleaning of the pan was very difficult unless the whole Feeder Assembly is totally disengaged from the feeding line and the entire assembly dissembled, some residual feed always remained in the Pan and cleaning could not be done to utmost satisfaction. This emerged as a major problem.

Next problem was that the height of the Pan from base of the pan was about 54 mm. Adding to that the thickness of ring at the base and the thickness of the lowermost tip of the Pillars, both of which added to the height of the rim of the Pan from the ground level, the total height was about 70 mm. This was not comfortable for smaller chicks of some breeds having smaller stature than other breeds at same age.

Further, the inwardly curving shape of the outer rim of the Feeder Grill was obstructive to fully grown up birds, for access to the feed. There was no enough leg space for the birds beneath the Pan. For the purpose of giving strength, this rim was provided with a ring that press fitted into it from below surface [(9) in FIG. 14(A)].

Making assembly of Version 1 Poultry Feeder Assembly from its parts was also tedious/difficult due to the need of the ring to which the Pillars should be attached at the lower end and then inserted through the sleeves of the Pan.

Further, the Feed Closer used to bend while opening and closing.

The Anti-rotation part was not sturdy and could get broken.

Still further, Version 1 was difficult to assemble and disassemble due to small size of the locking portion (36) (See FIG. 16A).

Still further, the part Lock (14) [FIG. 5] of prior art Version 1 was weak and did not have enough tensile strength that was required for its working as a lock.

Further, Version 1 Poultry Feeder Assembly had a total of 11 parts, which made assembling them that much complicated. Reduction in number of parts needed to be assembles was desired.

Above problems needed solution. Objective of this invention was to provide solutions to above problems.

In one embodiment of this invention, the Feeder Pan is separated from the Drop Tube portion, and the feeder pan is integrated as one piece with the cone and is named as "Feeder Pan-Cone" (25) (FIGS. 6, 8, 9 B, 10 B, 11B). The sleeves are now fixed on a ring at lower end and on the inner side of upper end with the Drop Tube portion to make one single piece, named as "Drop Tube Sleeves middle piece" (24)(FIGS. 6, 8, 9B, 10B, 11B, 12B). The ring has a mechanism by which it can attach and detach at its bottom end with the Feeder Pan-Cone part. In the illustrated embodiment, this attachment is a rotatable sliding arrangement which slidingly (can slide by applying pressure) rotates clockwise and anticlockwise and engages when rotated in one direction and disengages when rotated in another direction with the Feeder Pan-Cone; however, any other mechanism of attachment and detachment can be considered, the requirement is that it should be easy and convenient for attachment and detachment whenever required.

It is a further embodiment of this invention wherein the Pillars have a snap-lock which helps, while assembling the Poultry Feeder Assembly, to engage the pillars just by pushing them up through the sleeve and as soon as the snap-lock comes out from the upper end of the sleeve, with a clicking sound the locking portion of this snap-lock gets released, the Pillars get engaged with the sleeves and then the Pillars can drop back only until the snapped lock point reaches the top of the sleeve and then it cannot move further down (FIG. 12 B). Any other mechanism that achieves same function of ease of assembly and an arrangement that prevents pillars from automatic disengaging from the sleeves after their engaging with the sleeves can be used in place of snap lock, and is also included within the scope of this invention. Now there is no more a need of the ring of the version 1 (17) (FIG. 12A) on which the lower ends of the Pillars are attached. On the top end, the pillars pass through complementary holes (34) in [FIG. 19] of "Feed Regulator" (10). It is on the top ends of the Pillars that the Feeder Grill (19) of the inventive embodiment (Version 2) is supported when the feeder assembly is resting directly on the floor (FIG. 31). The Drop tube is permanently fixed at the inner ends of the sleeves.

The integration of the Feeder Pan-Cone and the Cone in one single structure as Feeder Pan-Cone which can be easily engaged and disengaged from the rest of the body of the feeder has made the job of final cleaning a very convenient activity. There is no scope for any part of the Pan to be difficult to clean since the Feeder Pan-Cone can be entirely removed by disengaging, cleaned and easily engaged back at the end of each crop of the birds. Further, this modification has provided an unmatched flexibility to the Poultry Feeder Assembly design, since it is now very much conceivable to make several designs of the Feeder Pan-Cones with various diameters, shapes and heights and use them interchangeably, as per requirement, with one and the same set of "Drop Tube-Sleeves middle piece" (24). In prior art Version 1, only one type of Pan could be used since the Pan and the Drop Tube were in one piece; if Pan is required to be of a different dimension or a different design, the entire feeder assembly was needed to be a different piece altogether. In the inventive embodiment, except for the Feeder Pan-Cone, rest of the assembly on its top can remain common and what needs to be replaced/interchanged is only the Feeder Pan-Cone part. Thus, once an arrangement is made in the Poultry Farm with the Poultry Feeder Assembly tied to ropes and the winch system, the only portion that needs to be varied, if required, is the Feeder Pan-Cone part.

In a further embodiment of this invention, the height of the rim of the Pan of the Feeder Pan-Cone from the base level is lesser than the height of same parameter of the Version 1. In the illustrated embodiment of this invention, Version 2, corresponding height of the Pan itself is about 35 mm and adding to that the thickness of structures that are touching to the floor, the total height is about 50 mm, which is about 20 mm less than the Version 1. This has solved the problem of small sized chicks of certain breeds for whom this height proved to be comfortable to reach up to the feed in the Pan. Based on further experience and requirements from case-to-case this height can be varied and any varied height shall also come within the scope of this invention.

In a still further embodiment of this invention, whereas, the Pan of the Version 1 is in the shape of a shallow bowl, however, the shape of the Pan of this invention is more like a saucer shaped plate that has incurving rim. This shape gives more comfortable leg space to the grown up birds. Based on further experience and requirements from case-to-case this shape can also be varied and any varied shape shall also come within the scope of this invention.

Further, as discussed above, a variety of designs of the Feeder Pan-Cone can be made based on further experience and requirements from case-to-case and any variation in the design shall also come within the scope of this invention.

The Feeder Pan-Cone has, at its base, holes that allow the lower ends of the Pillars to pass through the bottom. As a result, when the feeder is kept touching the ground when the chicks have just been introduced, the Feed Regulator is adjusted to drop down to lowermost position on the feeder, so that it allows only a small opening between the rim at lower end of the Feeder Regulator and the top surface of the Feeder Pan-Cone, allowing only a limited quantity of feed to come out that is sufficient for the day-old chicks. At this instance the Feed Regulator can also be locked into the upper end in the Lock, so that there is an enough gap between the lower rim of the Feeder Grill and upper rim of the Pan, which is comfortable for the chicks to get through up to the feed in the Pan. Since the height of the rim is low, even if accidentally some chicks manage to get into the Pan despite the barrier of the lower rim of the Feeder Grill, they can equally easily get out also (FIG. 31).

In a further embodiment of this invention, the outer rim of the Feeder Grill (8) had one more ring (9) provided below the rim to add strength to the incurving ring at its rim in the Version 1 (FIG. 5), which has been eliminated (see FIG. 6). Instead, the rim of this invention is concave having smaller diameter at lower end and a bigger diameter at the higher end giving it a shape of a ring as if it is a peripheral portion of a "saucer". This feature is less obstructive to birds and provides a very comfortable access to the grown up birds to the feed and enables producing the Feeder Grill as one single piece. Still further, when this rim rests on the rim of the Feeder Pan-Cone, it also provides an effect of improved circumference to the Feeder Pan-Cone and provides a further leg space to the grown up birds while feeding. In the inventive version, the rim actually is only in one single piece, the separate reinforcing ring at its lower surface is eliminated completely and the rim, now, is a ring that extends outwardly to provide a further increase in the diameter, providing further leg space below it and easier access for the birds to the feed. Based on further experience and requirements from case-to-case this saucer shape of the ring can be varied and any further variation in the shape of the ring shall also come within the scope of this invention.

In a further embodiment of this invention, the Feed Closer is made thicker so that it does not bend during opening and closing of the feed inlet.

In a still further embodiment of this invention, the "anti-rotation part" is also made more sturdy so that it does not break up.

In a further embodiment of this invention the lock of the locking portion of the cap in this invention is large in size and easy to handle, and helps in easier assembling of the Poultry Feeder Assembly.

In a further embodiment of this invention, the part Lock (14) [FIG. 6] of improved Version 2 had better tensile strength wherein a Rib "R" is added to improve the strength of lock part, which has also added increased stiffness.

The inventive embodiment, Version 2 of the Poultry Feeder Assembly (FIGS. 4, 6), has 9 parts which are easier to assemble when compared to the prior art Version 1.

Working of Automatic Poultry Feeder Assembly:

When chicks are young, the feeder bottom touches to the ground surface so that it becomes easy for chicks to eat feed from pan version 2 (25) [FIG. 6]. The feeder grill version 2 (19) [FIG. 6] is hanged on the locks (14) [FIG. 6] of feeder assembly. When the motor of drive unit runs it makes auger (38) present in the feeder to rotate and causes the feed from small hopper (2) in [FIG. 1, general layout of feeder assembly line] to convey and fall in the feeder pan version 2 (25) [FIG. 6]. FIG. 31 shows the operating stage of feeder when feeder grill is at its uppermost position.

When chicks grow, the feeder assembly is lifted using wire rope (1) and pulley arrangement system and Feeder Grill version 2 (19) [FIG. 6] is dropped so that the chicks that are grown tall enough can eat feed easily from pan (25) [FIG. 6] through the grill of the Feeder Grill. FIG. 32 shows the operating stages of poultry feeder when Feeder Grill is dropped to its lowermost position.

In the prior art Version 1 of the Poultry Feeder Assembly, the Poultry Feeder Assembly was designed to suit the requirements of older birds as well as chicks. However small chicks were not comfortable to eat feed from feeder pan.

The inventive embodiment of the Poultry Feeder Assembly, Version 2, suited to the requirements of all stages of growth: starting from day old chicks through further intermediate development stages of chicks of small as well as large breeds and finally up to the fully grown birds from the same feeder assembly; there was no need of providing supplementary pans or trays for chicks. The embodiment of this invention, the Version 2 Poultry Feeder Assembly provides options for adjusting the Poultry Feeder Assembly for requirements of each stage of the growing flock of the birds by adjusting the level of the assembly from ground level in one single action combined with, as per requirement, adjusting, as elaborated above, the levels of the Feed Regulator and the Feeding Grill. This resulted in avoiding feed spoilage, gave clean and hygienic atmosphere for birds, provided ample of desired amount of feed at all time, had a control over the opening or closing of individual feeder pan by sliding the part Feed Closer version 2 (20) in [FIG. 6, Improved Poultry Feeder Assembly] and easier and quicker and thorough cleaning at the end of each crop of birds.

Further, the supply of feed was uniform to all Poultry Feeder Assembly stations.

The roof of individual Poultry Feeder Assembly was so constructed that it did not allow the birds to jump and sit in to the pan and contaminate the feed.

All these features brought safety for birds, mortality rate was reduced, the feed level in individual feeder pan was managed using Feed Regulator and manual operations were reduced to minimum, less labor was required.

When chicks saw some of them eating from pan there was self learning by chicks to feed in the pan.

The Poultry Feeder Assemblies of this invention were made of polymers which include, without limitation, Polypropylene (PP), Glass filled Polypropylene (GFPP), Polyoxymethylene (POM) (Acetal), which were robust, strong enough to withstand external conditions, maintainable, safe and recyclable. Any other material may also be used if it permits making of the same designs. To these polymers, various additives were added to improve their strength, aesthetic look and various other properties for which they are intended to be used. Each part was made with material suitable for its working needs.

A person skilled in the art will readily understand form the figures and descriptions in this specification a number of variations and equivalents that are obvious to him. All the figures and dimensions shown in them are only illustrative and not limiting to the scope of the invention disclosed here. All variations and equivalents obvious to a person skilled in the art are included within the scope of this invention.

Note—All dimensions used in this report are in millimeters (mm). However, the invention is not limited by the dimensions given herein for the illustrated parts nor by the illustrated drawings; the dimensions and the visual shape and appearance of the relevant parts can vary according to preference, of the user and manufacturer; and all variations in the dimensions and visual shape and appearance of the parts having same function are considered as included within the scope of this invention.

The invention claimed is:

1. A poultry feeder assembly for providing access to feed to chicks of small breeds as well as growing and fully grown up birds from the same poultry feeder assembly,
    the poultry feeder assembly comprising a pan means for holding feed,
    the poultry feeder assembly comprising a barrier to minimize entry of the chicks into the pan means of the poultry feeder assembly,
    the poultry feeder assembly having means to attach to a feeder pipe for automatic conveying of feed from a small hopper to the poultry feeder assembly,
    the poultry feeder assembly having means conveying the feed from feeder pipe into the poultry feeder assembly,
    the poultry feeder assembly having means to convey the feed received into the poultry feeder assembly to the pan means through a tube named as "drop tube", and
    wherein
    for cleaning purposes,
    the pan means is integrated with a cone projecting upward from a base of the pan means, and
    the pan means integrated with the cone is removably attached to the drop tube such that the cone is received by the drop tube.

2. The poultry feeder assembly according to claim 1 attachable by a means for attaching the poultry feeder assembly to the feeder pipe and further comprising:
    a. a means for controlling an amount of feed that shall drop from the feed pipe,
    b. means for adapting the poultry feeder assembly to the progressively changing requirements of height, accessibility to the feed and leg space requirements as the chicks grow up from day-old stage through intermediate stages of growth up to maximum growth.

3. The poultry feeder assembly according to claim 2, wherein the means for attaching the poultry feeder assembly to the feeder pipe comprises a feeder cap provided with a locking portion and an anti-rotation device to prevent rotation of the poultry feeder assembly around the feeder pipe.

4. The poultry feeder assembly according to claim 2, wherein
    a. the means for controlling the amount of feed that shall drop from the feed pipe into the poultry feeder assembly comprises a feed closer,
    b. the means conveying the feed from feeder pipe comprises a tube, named as drop tube, upper open end of which coincides or approximates beneath an opening of the feeder pipe on a lower side of the feeder pipe beneath the point at which the poultry feeder assembly is attached to the feeder pipe for receiving the feed conveyed by an automatic conveying arrangement of the feeder pipe, and has a lower end that is open above a central surface of the pan means that receives this feed and allows the feed to get spread to peripheral part of the pan means, and
    c. the means that adapt the poultry feeder assembly to the progressively changing requirements of height, accessibility to the feed and leg space requirements as chicks grow up from day-old stage to a full grown stage are provided by features which comprises: (i) height of the outer rim of the pan means convenient for access to the feed of day-old chicks of small breeds of poultry also when the poultry feeder assembly is placed on the ground, (ii) a loosely fitting cylindrical part, named as a feed regulator, around a lower part of the drop tube that can freely move up and down along height of the drop tube and be fixed as required at various locations along a movable path so as to provide a flexibility or variability in a space it encloses below a lower end of the drop tube, thus enabling control and regulation of the amount of feed coming out from a space below the lower end of the drop tube and become available to the feeding chicks in a peripheral part of the pan means as per a changing requirement from a day-old smallest size of the chicks to fully grown size of the birds, (iii) a grill, named as feeder grill, around the drop tube which can slide to a limited extent along the height of the drop tube and be positioned at desired locations such that it can reciprocate to changing position of the feed regulator relative to the height of the drop tube and also can be brought down to rest on the rim of a feeder pan-cone if desired, wherein the feeder pan-cone is the pan integrated on a central portion of an upper surface of the pan with a cone, a wide base of which is accommodated within the diameter of the ring and the tip of which extends into an inner space of the lower part of the drop tube thereby limiting a space available to the feed to that extent and ensuring that a major portion of the dropped feed is conveyed to the peripheral part of the pan which receives dropped feed and becomes available for the feeding chicks or birds; the pan integrated with the cone as a collective structure hereinafter being named as "feeder pan-cone" and (iv) the poultry feeder assembly relative to ground level being adjustable as required during different growth stages of chicks and birds.

5. The poultry feeder assembly according to claim 4 wherein the pan means comprises a feeder pan that is directly attached to means conveying feed from the feeder pipe but is not integrated with, and is separable for cleaning purpose from the means that conveys feed received from the feeder pipe to the pan means so as to facilitate complete retrieval of unused feed at an end of a feeding cycle of a batch of chicks and birds and before a start of a next cycle of feeding a next batch of chicks and birds in the same poultry house using a same set up of semi-automatic feeding system.

6. The poultry feeder assembly according to claim 4 or claim 5 wherein:
   a. thickness of the feed closer required to resist bending in repeated use in long run,
   b. wherein:
      i. the feeder pan-cone is provided with holes below bottom holes of the sleeves to allow to pass through each sleeve a rod shaped device, named as "pillar" and collectively as pillars, the pillars meant for supporting the feed regulator at a position that is highest from upper surface of the pan when the poultry feeder assembly is placed on the ground,
      ii. the feed regulator is provided with wing shaped projections that extend into space at sides of the feed regulator so as to divide space available for the birds to feed and has a projection at a lower end that extends downwards and can be fixed as required at various locations along a movable path on steps which radiate as projections at a base of the sleeves and provide a point on which a lower end of the projection rests,
      iii. the feeder grill being provided with two projections opposite to each other on two sides of the feeder grill at a top end of an inner perimeter of the feeder grill directed towards the drop tube, the projections being engageable in and slidable along slots, the slots comprising (a) one or more pairs of elongated slots on the perimeter of an upper portion of the drop tube below a slot for the feed closer, or (b) a pair of elongated slots on an elongated structure named as lock, a locking portion being located in an elongated depression provided for housing the locking portion along the length of the drop tube, the two projections get engaged in one of the one or more pairs of elongated slots specified above either in (a) or (b) when the poultry feeder assembly is placed on the ground and the feeder grill gets pushed to an uppermost position by the action of the pillars, and the feeder grill being located at the lowermost end of the elongated slots when the poultry feeder assembly is lifted from the ground by a winch system to hang at a height from ground and the lock is pressed inside elongated the depression below it thereby releasing the feeder grill from a notch when the pillars come out of a bottom of the pan means and the feeder grill is allowed to drop to come to rest on an upper rim of the pan means.

7. The poultry feeder assembly according to claim 6 wherein:
   a. the ring is removably attached to the central portion of a base of the pan means by an arrangement that locks or unlocks by clock-wise or anti-clockwise movement against the feeder pan-cone, thereby enabling complete retrieval of residual feed by just unlocking the feeder pan-cone from the rest of the poultry feeder assembly comprising the drop tube-sleeves middle piece which is still attached to the feeder pipe, making cleaning job very easy and labour saving,
   b. wherein:
      i. the holes provided to the feeder pan-cone being three in numbers, the rod shaped devices also being three in number one in each hole,
      ii. each pillar of the pillars being provided with a snap lock so that while making assembly of parts it can simply be pushed in from a base of the opening of the sleeves and comes out from an-upper end and the snap lock opens and prevents it falling back again on its own thereby making assembly of the poultry feeder assembly very easy, and is of such a height that when the poultry feeder assembly is kept on ground, the pillars get inserted in the sleeves and push the feed regulator at an uppermost position along a drop tube portion of the drop tube-sleeves middle piece engaging the feed regulator in the notch in the middle of the lock; thereby providing access to the chicks of small breeds also for feed through a gap between the upper rim of the pan of the feeder pan-cone,
      iii. the steps are provided as three pairs with three heights, each pair comprising steps being located opposite to each other along a circle formed by the base of the sleeves,
      iv. the feeder grill comprising an outer rim that projects upwardly and outwardly which in effect provides less resistance to grown up birds while getting access to feed on one hand and provides an additional distance from a base of an outward rim of the feeder pan-cone, thereby providing more leg space and comfort to the grown up birds while feeding.

8. The poultry feeder assembly according to claim 7 wherein:
   a. the thickness of the feed closer is at least 3 mm,
   b. height of the upper rim of the pan of the feeder pan-cone does not exceed 54 mm,
   c. one pair of the steps has a height of 19.8 mm, a second pair of the steps has a height of 24.8 mm and third pair of the steps has a height of 29.8 mm.

9. The poultry feeder assembly according to claim 1, wherein
   at least one or a combination of two or more of the following features that provide the poultry feeder,
      a) the drop tube is integrated at its lower end with sleeves that are open at both ends and the sleeves are supported by a ring that is removably attached to a central portion of a base of the pan means that holds dropped feed (25), the drop tube integrated with the sleeves as a collective structure hereinafter being named as "drop tube—sleeves middle piece",
      b) the pan means comprises feeder pan that is integrated on a central portion of the upper surface of the pan with a cone, a wide base of which is accommodated within the diameter of the ring and the tip of which extends into an inner space of the lower part of the drop tube thereby limiting a space available to the feed to that extent and ensuring that a major portion of the dropped feed is conveyed to a peripheral portion of the pan which receives the dropped feed and becomes available for the feeding chicks or birds; the pan integrated with the cone as a collective structure hereinafter being named as "feeder pan-cone" (25), and c) the feeder pan-cone is provided with holes below bottom holes of the sleeves to allow to pass through each sleeve a rod shaped device, named as "pillar", the pillar being meant for supporting a feed regulator at a position that is highest from the upper surface of the pan when the poultry feeder assembly is placed on the ground.

10. The poultry feeder assembly according to claim 1, wherein the drop tube is integrated at its lower end with sleeves that are open at both ends and the sleeves are supported by a ring that is removably attached to a central portion of a base of the pan that holds dropped feed, the term "removably" meaning thereby that a part is attached in assembled condition but can be removed when required to be disassembled, the drop tube integrated with the sleeves as a collective structure hereinafter being named as "drop tube—sleeves middle piece".

\* \* \* \* \*

UNITED STATES PATENT AND TRADEMARK OFFICE
CERTIFICATE OF CORRECTION

PATENT NO. : 11,980,166 B2
APPLICATION NO. : 15/523346
DATED : May 14, 2024
INVENTOR(S) : Anil Somnath Dhumal It is certified that error appears in the above-identified patent and that said Letters Patent is hereby corrected as shown below:

On the Title Page

Item (54) and in the Specification, Column 1, Lines 1-3, delete "POULTRY FEEDER INCLUDING PAN MEANS AND REMOVABLY ATTACHED DROP TUBE" and insert -- POULTRY FEEDER INCLUDING PAN MEANS REMOVABLY ATTACHED TO DROP TUBE -- therefor.

Signed and Sealed this
Eighteenth Day of June, 2024

Katherine Kelly Vidal
*Director of the United States Patent and Trademark Office*